US007065226B1

(12) United States Patent
Anzai et al.

(10) Patent No.: US 7,065,226 B1
(45) Date of Patent: Jun. 20, 2006

(54) METHOD FOR EMBEDDING INFORMATION AND EXTRACTING THE SAME

(75) Inventors: Kousuke Anzai, Fujisawa (JP); Isao Echizen, Yokohama (JP); Hiroshi Yoshiura, Tokyo (JP); Shinobu Eikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 600 days.

(21) Appl. No.: 09/583,952

(22) Filed: May 31, 2000

(30) Foreign Application Priority Data

Jun. 1, 1999 (JP) ................................. 11-153672

(51) Int. Cl.
G06K 9/00 (2006.01)
G06K 9/36 (2006.01)

(52) U.S. Cl. ..................................... 382/100; 382/232

(58) Field of Classification Search ................ 382/100, 382/232; 380/210, 252, 287, 54; 713/176
See application file for complete search history.

(56) References Cited

U.S. PATENT DOCUMENTS

| 5,721,788 | A | * | 2/1998 | Powell et al. | ............... | 382/100 |
|---|---|---|---|---|---|---|
| 6,072,888 | A | * | 6/2000 | Powell et al. | ............... | 382/100 |
| 6,285,774 | B1 | * | 9/2001 | Schumann et al. | ......... | 382/100 |
| 6,341,350 | B1 | * | 1/2002 | Miyahara et al. | ........... | 713/176 |
| 6,510,233 | B1 | * | 1/2003 | Nakano | ..................... | 382/100 |

FOREIGN PATENT DOCUMENTS

JP 7-290767 11/1995

OTHER PUBLICATIONS

Michell, Multimedia Data-Embedding and Watermarking Technologies, Proceeding of the I.E.E.E., vol. 86, No. 6, Jun. 1988.*
Jana, Robust MPEG Video Watermarking Technologies, ACM Multimedia'98, UK, ACM 1-58113-036-8/98/0008.*
Rakesh Dugad et al. "A New Wavelet-Based Schem for Watermarking Images". I.E.E.E. Image Processing, 1998. vol. 2, pp. 419-423.*
"Data Hiding Based on Neighbor Statistics", Seiji Kobayashi, et al, Proceedings of the 56th Nation Convention of Information Processing Society of Japan, 3-37 to 3-38.

* cited by examiner

Primary Examiner—Samir Ahmed
Assistant Examiner—Brian Le
(74) Attorney, Agent, or Firm—Mattingly, Stanger, Malur & Brundidge, P.C.

(57) ABSTRACT

A method of embedding digital watermark information $b_1-b_n$ ($2 \leq n$) in image data. The image data is divided into a plurality of areas S each consisting of M×N ($1 \leq M$, N) pixels. A plurality of areas G each consisting of P×Q ($1 \leq P$, Q) of the areas S are defined. Each of the areas S constituting each area G is allocated to some one of: areas $T_1-T_n$ in which said digital watermark information $b_1-b_n$ is respectively embedded and areas $H_1-H_m$ ($1 \leq m$) in which information is not embedded. One or more areas T and one or more areas H are located in a predetermined arrangement in each area G. And, the plurality of areas G are located in a predetermined rule.

6 Claims, 18 Drawing Sheets

FIRST PATTERN

| $S_1$ ⇧ | $S_2$ ⇧ | $S_3$ ⇧ |
|---|---|---|
| $S_4$ ⇧ | $S_5$ ⇧ | $S_6$ ⇧ |
| $S_7$ ⇧ | $S_8$ ⇧ | $S_9$ ⇧ |

GROUP G

SECOND PATTERN

| $S_1$ ⇧ | $S_2$ ⇩ | $S_3$ ⇧ |
|---|---|---|
| $S_4$ ⇩ | $S_5$ ⇧ | $S_6$ ⇩ |
| $S_7$ ⇧ | $S_8$ ⇩ | $S_9$ ⇧ |

GROUP G

⇧ FOR A BIT 1, BRIGHTNESS IS INCREASED.
FOR A BIT 0, BRIGHTNESS IS DECREASED

⇩ FOR A BIT 1, BRIGHTNESS IS DECREASED.
FOR A BIT 0, BRIGHTNESS IS INCREASED.

FIG.11

ORIGIN O → X

| $T_4$ | H | $T_5$ | $T_4$ | H | $T_5$ | $T_4$ | H | $T_5$ | $T_4$ | H | $T_5$ | $T_4$ | H | $T_5$ | $T_4$ | H | $T_5$ |
|---|---|---|---|---|---|---|---|---|---|---|---|---|---|---|---|---|---|
| $T_6$ | $T_7$ | J | $T_6$ | $T_7$ | J | $T_6$ | $T_7$ | J | $T_6$ | $T_7$ | J | $T_6$ | $T_7$ | J | $T_6$ | $T_7$ | J |
| $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ |
| $T_4$ | H | $T_5$ | $T_4$ | H | $T_5$ | $T_4$ | H | $T_5$ | $T_4$ | H | $T_5$ | $T_4$ | H | $T_5$ | $T_4$ | H | $T_5$ |
| $T_6$ | $T_7$ | J | $T_6$ | $T_7$ | J | $T_6$ | $T_7$ | J | $T_6$ | $T_7$ | J | $T_6$ | $T_7$ | J | $T_6$ | $T_7$ | J |
| $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ |
| $T_4$ | H | $T_5$ | $T_4$ | H | $T_5$ | $T_4$ | H | $T_5$ | $T_4$ | H | $T_5$ | $T_4$ | H | $T_5$ | $T_4$ | H | $T_5$ |
| $T_6$ | $T_7$ | J | $T_6$ | $T_7$ | J | $T_6$ | $T_7$ | J | $T_6$ | $T_7$ | J | $T_6$ | $T_7$ | J | $T_6$ | $T_7$ | J |
| $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ | $T_1$ | $T_2$ | $T_3$ |
| $T_4$ | H | $T_5$ | $T_4$ | H | $T_5$ | $T_4$ | H | $T_5$ | $T_4$ | H | $T_5$ | $T_4$ | H | $T_5$ | $T_4$ | H | $T_5$ |
| $T_6$ | $T_7$ | J | $T_6$ | $T_7$ | J | $T_6$ | $T_7$ | J | $T_6$ | $T_7$ | J | $T_6$ | $T_7$ | J | $T_6$ | $T_7$ | J |

SHIFTED IMAGE DATA

GROUP G

Y ↓

WATERMARK INFORMATION $b_1$ → AREA $T_1$
WATERMARK INFORMATION $b_2$ → AREA $T_2$
WATERMARK INFORMATION $b_3$ → AREA $T_3$
WATERMARK INFORMATION $b_4$ → AREA $T_4$
WATERMARK INFORMATION $b_5$ → AREA $T_5$
WATERMARK INFORMATION $b_6$ → AREA $T_6$
WATERMARK INFORMATION $b_7$ → AREA $T_7$
EMBEDDING INFORMATION p → AREA J
NO INFORMATION → AREA H

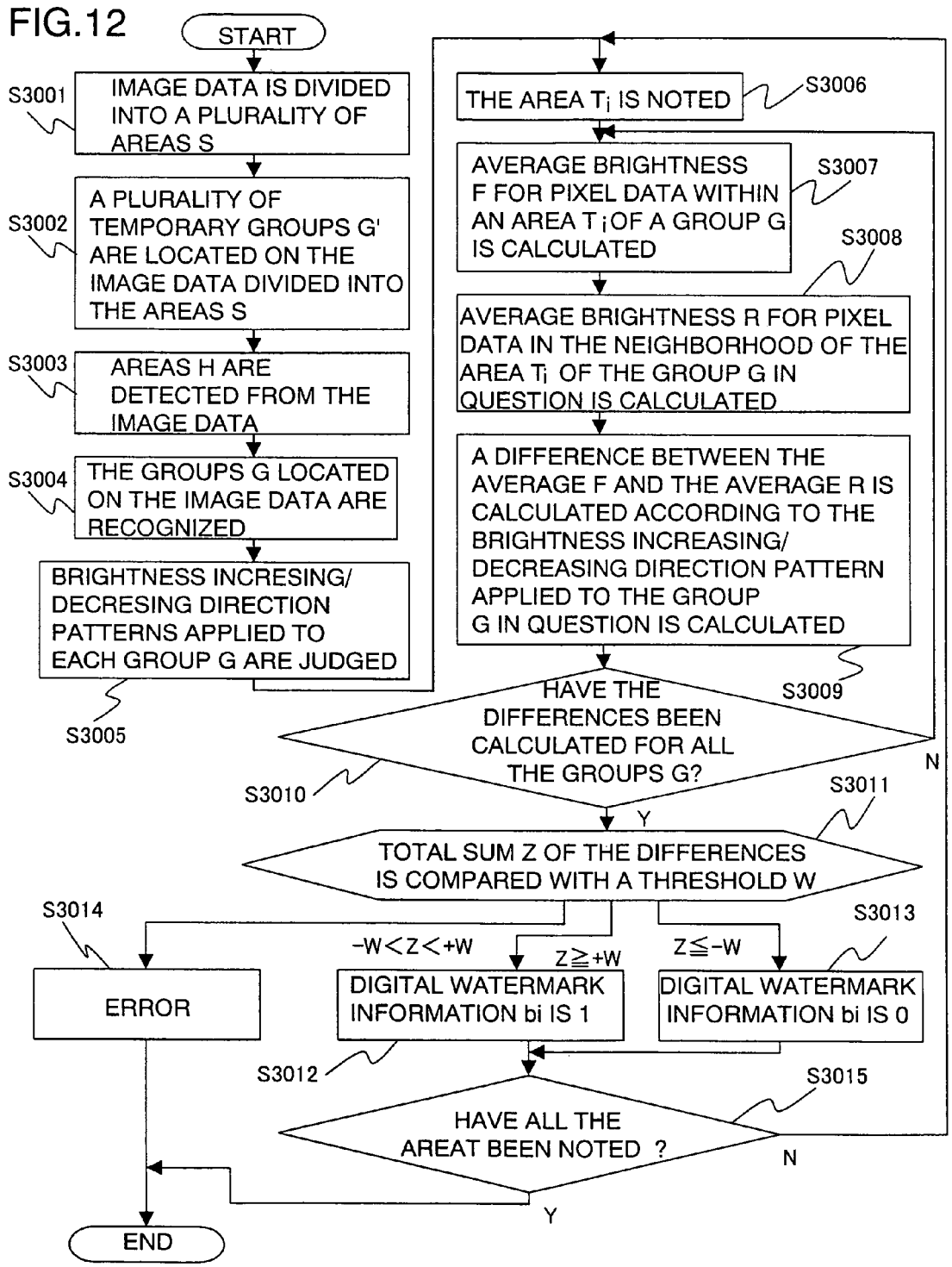

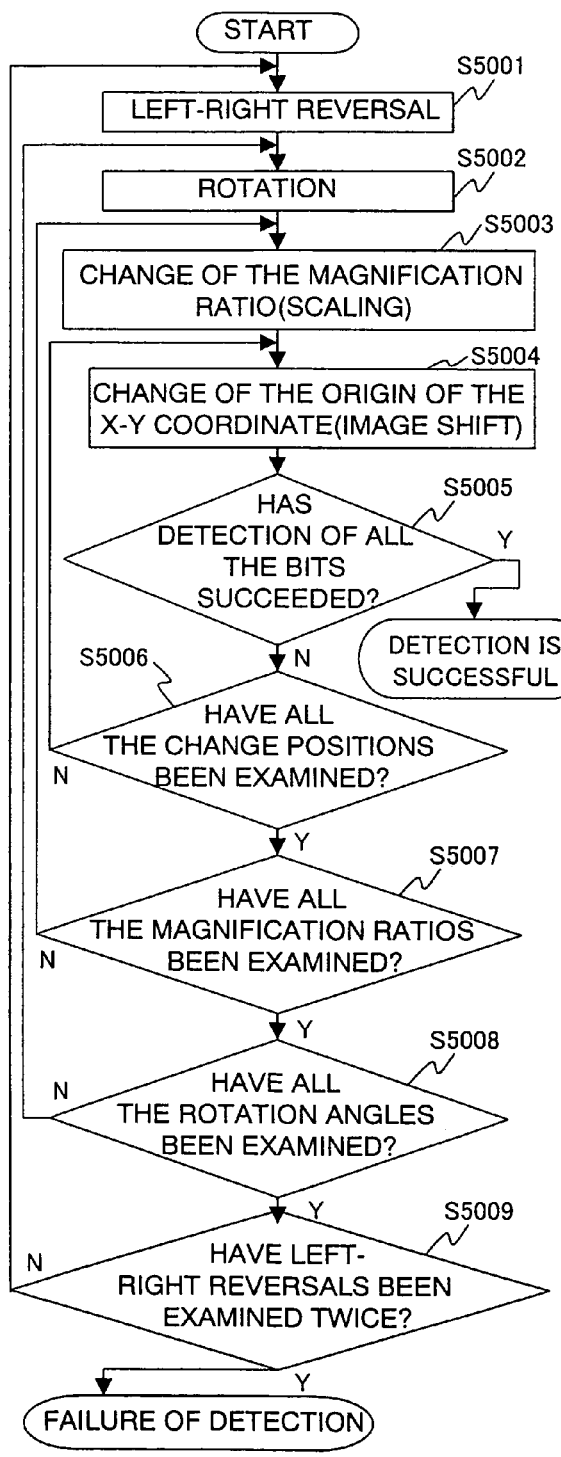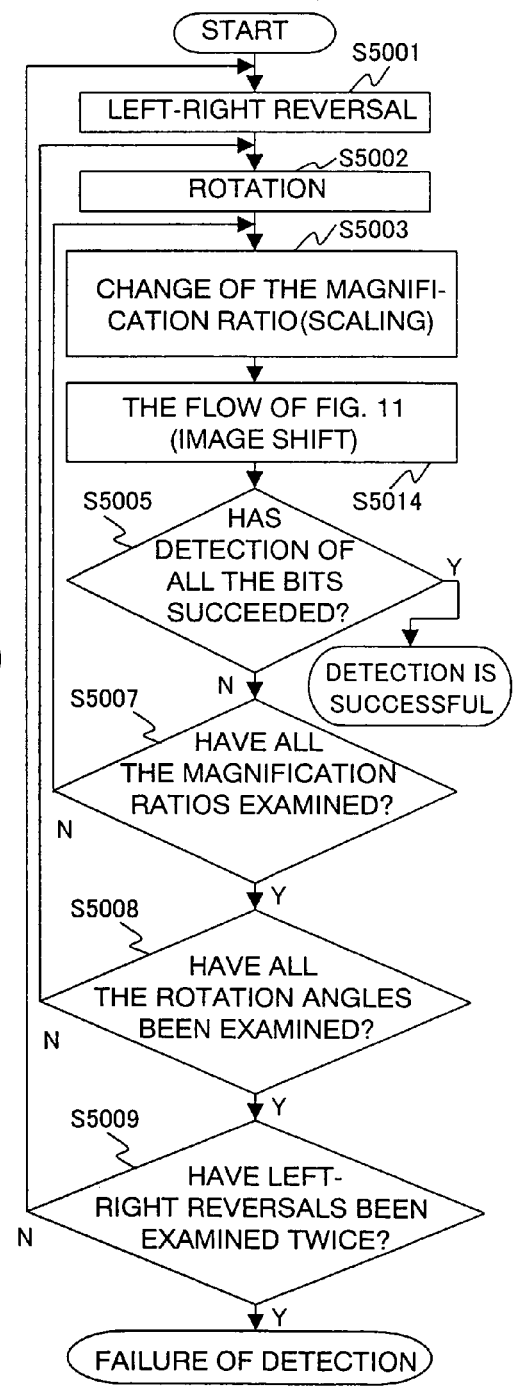

WATERMARK INFORMATION $b_1$ → AREA $T_1$
WATERMARK INFORMATION $b_2$ → AREA $T_2$
WATERMARK INFORMATION $b_3$ → AREA $T_3$
WATERMARK INFORMATION $b_4$ → AREA $T_4$
WATERMARK INFORMATION $b_5$ → AREA $T_5$
WATERMARK INFORMATION $b_6$ → AREA $T_6$
WATERMARK INFORMATION $b_7$ → AREA $T_7$
EMBEDDING INFORMATION p → AREA J
NO INFORMATION → AREA H

METHOD FOR EMBEDDING INFORMATION AND EXTRACTING THE SAME

CROSS-REFERENCES TO RELATED APPLICATIONS

This application claims priority from Japanese Patent Application No. 11-153672 filed on Jun. 1, 1999 and No. 11-75007 filed on Mar. 19, 1999, the entire contents of which are incorporated herein by reference for all purposes. This application relates to the U.S. patent application Ser. No. 09/388,447, filed on Sep. 2, 1999, which claims priority from Japanese Patent Applications No. 10-343119 filed on Dec. 2, 1998, No. 11-075006 filed on Mar. 19, 1999, and No. 11-153385 filed on Jun. 1, 1999.

BACKGROUND OF THE INVENTION

The present invention relates to a technique of digital watermarking of digital data, in particular, multimedia data such as image data.

Recently, the technique of digital watermarking has the attention from the viewpoint of copyright protection of multimedia data such as image data. By the technique of digital watermarking, given information is embedded in multimedia data, and that given information can not be extracted from the multimedia data in question at least without employing a given rule. Using this technique, information, for example, on a purchaser of image data is embedded in an invisible form in the image data itself according to a given rule. When the data is copied illegally, then, by extracting the embedded information from the illegally-copied data according to the above-mentioned given rule, it is possible to specify a person (i.e., the purchaser) who has carried out the illegal copying.

Image data having embedded digital watermark information may be subject to various image processing such as shifting, scaling, and rotation. Thus, it is desired that a given information can be extracted from multimedia data even in those cases.

SUMMARY OF THE INVENTION

According to the present invention, even if image data having digital watermark information has been subjected to the above-mentioned image processing, it is possible to specify positions in which the digital watermark information is embedded, in the image data in question.

The present invention provides a method of embedding digital watermark information, in which image data is divided into a plurality of areas S each consisting of M×N ($1 \leq M$, N) pixels, and each bit of digital watermark information $b_1$–$b_n$ ($2 \leq n$) is embedded in at least one of the mentioned plurality of areas S, wherein:

the mentioned digital watermark information $b_1$–$b_n$ is embedded in the image data such that:

a plurality of groups, each having a predetermined array consisting of areas $T_1$–$T_n$ in which the mentioned digital watermark information $b_1$–$b_n$ is respectively embedded and areas $H_1$–$H_m$ ($1 \leq m$) in which information is not embedded, are located according to a predetermined rule; and each of the mentioned areas S is allocated to some one of the mentioned areas $T_1$–$T_n$ and $H_1$–$H_m$.

According to the above-described mode of the invention, the groups G each having the predetermined array consisting of the areas $T_1$–$T_n$ in which the digital watermark information $b_1$–$b_n$ is respectively embedded and the areas $H_1$–$H_n$ ($1 \leq m$) in which information is not embedded, are located according to a predetermined rule, in such a manner that each of the areas S obtained by dividing the image data is necessarily allocated some one of the mentioned areas $T_1$–$T_n$ and $H_1$–$H_m$.

Thus, even when image shift (i.e., processing of changing the origin in the X-Y coordinates for specifying a location of each pixel constituting the image data in question) is carried out on the image data in which the digital watermark information $b_1$–$b_n$ is embedded in such a manner, and accordingly, the locations of the areas T1–Tn in which the digital watermark information is embedded are changed in the X-Y coordinates, it is possible to recognize each of the groups located on the image data by detecting the areas $H_1$–$H_m$ in which information is not embedded, in the areas S, and based on the values of X-Y coordinates of the detected areas $H_1$–$H_m$ on the image data. In each group, the areas $T_1$–$T_n$ in which digital watermark information $b_1$–$b_n$ is respectively embedded and the areas $H_1$–$H_m$ in which the digital watermark information is not embedded are located in the predetermined arrangement. As a result, for each group, it is possible to specify the areas $T_1$–$T_n$ in which the digital watermark information $b_1$–$b_n$ is respectively embedded.

Further, the present invention provides a method of embedding digital watermark information, in which image data is divided into a plurality of areas S each consisting of M×N ($1 \leq M$, N) pixels, and each bit of digital watermark information $b_1$–$b_n$ ($2 \leq n$) is embedded in at least one of the mentioned areas S, wherein:

a plurality of groups, each having a predetermined array consisting of areas $T_1$–$T_n$ in which the mentioned digital watermark information $b_1$–$b_n$ is respectively embedded, areas $J_1$–$J_k$ ($1 \leq k$) in which information $p_1$–$p_k$ specifying an embedding format for embedding the digital watermark information $b_1$–$b_n$ in said areas $T_1$–$T_n$, and areas $H_1$–$H_m$ ($1 \leq m$) in which information is not embedded, are located according to a predetermined rule; and each of the mentioned areas S is allocated to some one of the mentioned areas $T_1$–$T_n$, $J_1$–$J_k$, and $H_1$–$H_m$; in embedding the mentioned digital watermark information $b_1$–$b_n$ and the mentioned information $p_1$–$p_k$ specifying the mentioned embedding format, in the image data.

According to the above-described mode of the present invention, the groups, each having the predetermined array consisting of the areas $T_1$–$T_n$ in which the digital watermark information $b_1$–$b_n$ is respectively embedded, the areas $J_1$–$J_k$ in which the information $p_1$–$p_k$ specifying the embedding format for the mentioned digital watermark information $b_1$–$b_n$ in the mentioned areas $T_1$–$T_n$ is embedded, and the areas $H_1$–$H_m$ in which information is not embedded, are located according to the predetermined rule such that each of the areas S obtained by dividing the image data is necessarily allocated to some one of the mentioned areas $T_1$–$T_n$, $J_1$–$J_k$, and $H_1$–$H_m$.

Thus, even when image shift is carried out on the image data in which the digital watermark information $b_1$–$b_n$ is embedded in such a way, and accordingly, X-Y coordinate locations of the areas $T_1$–$T_n$ in which the digital watermark information $b_1$–$b_n$ is embedded are changed, it is possible to recognize each of the groups located on the image data by dividing the image data on which this image shift has been carried out into a plurality of areas S and by detecting the areas $H_1$–$H_m$ in which information is not embedded from the areas S, and based on the X-Y coordinates values of the detected areas $H_1$–$H_m$ on the image data.

Further, in the present mode, for each group, the information $p_1$–$p_k$ specifying the embedding format for the digital watermark information $b_1$–$b_n$ in the areas $T_1$–$T_n$ is embedded in the areas $J_1$–$J_k$. Accordingly, even when an embedding format for the digital watermark information $b_1$–$b_n$ is changed for each group, it is possible to extract the digital watermark information $b_1$–$b_n$ from the image data.

BRIEF DESCRIPTION OF THE DRAWINGS

The present invention will be more apparent from the following detailed description, when taken in conjunction with the accompanying drawings, in which:

FIG. 3 is a view for explaining an operation principle of an information embedding part 104 of the digital watermark information embedding apparatus 1 shown in FIG. 1;

FIG. 4 is a view for explaining the operation principle of the information embedding part 104 of the digital watermark information embedding apparatus 1 shown in FIG. 1;

FIG. 11 is a view for explaining the operation principle of the group recognizing part 304 of the digital watermark information extracting apparatus 3 shown in FIG. 9;

FIG. 12 is a flowchart for explaining operation of the digital watermark information extracting apparatus 3 shown in FIG. 9;

FIGS. 13A and 13B are flowcharts for explaining a difference in processing burdens between the case (FIG. 13A) in which the method of repeating the same transformation processing as the left-right reversal, scaling processing, and rotation processing that might have been carried out on image data until the digital watermark information $b_1$–$b_n$ is extracted from the image data is applied to the transformation by image shift processing and the case (FIG. 13B) in which the mentioned method is combined with the extract method of the present embodiment;

DETAILED DESCRIPTION OF THE PREFERRED EMBODIMENTS

Figure 17:
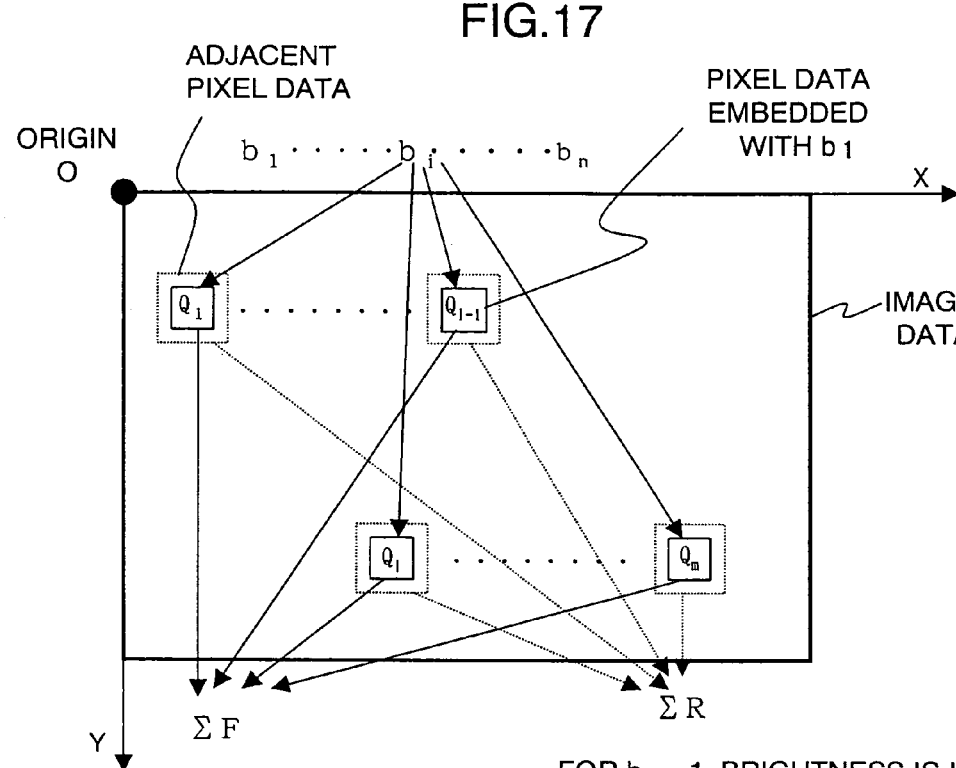
FIG. 17 is a view for explaining a principle of embedding and extracting information in and from image data by a digital watermarking technique.

FIG. 17 is a view for explaining a method of embedding and extracting information in and from image data by a digital watermarking technique.

As shown in the figure, in information embedding processing, with respect to each bit $b_i$ ($0 \leq i \leq n$) out of bits $b_1$–$b_n$ constituting information that is desired to be embedded, brightness of each of pixels positioned in predetermined areas $Q_1$–$Q_m$ in the image data is changed to increase by U when the bit in question is 1, and to decrease by U when it is 0. By carrying out this processing for every bit $b_1$–$b_n$ while changing positions of the areas in which the bit in question is embedded, digital watermark information is embedded in the image data.

In processing of extracting the above-mentioned embedded digital watermark information, with respect to a bit $b_i$ ($0 \leq i \leq n$) out of the bits $b_1$–$b_n$ constituting the embedded information, an average brightness F of pixel data is obtained for each of the above-mentioned predetermined areas $Q_1$–$Q_m$ of the image data, so as to obtain the sum total $\Sigma F$ of these averages. Further, an average brightness R of pixel data is obtained for respective peripheral areas adjacent to the above-mentioned predetermined areas $Q_1$–$Q_m$, so as to obtain the sum total $\Sigma R$ (Reference Value) of these averages. When $\Sigma F - \Sigma R \geq Th$ (where, Th differs depending on required error rates, and here it is assumed that $Th = \frac{1}{2} \times U \times m$ (m: the number of the areas Q in which $b_i$ is embedded)), then it is judged that $b_i = 1$. When, $\Sigma F - \Sigma R \leq -Th$, then it is judged that $b_i = 0$. And, when $-Th < \Sigma F - \Sigma R < Th$, then it is judged that information is not embedded in the above-mentioned predetermined areas $Q_1$–$Q_m$. This processing is carried out for every bit $b_1$–$b_n$, so as to extract the digital watermark embedded in the image data.

Digital watermarking technique is described in detail in Proceedings of the 56th National Convention of IPSJ 1998, pages 3-37–3-38.

Figure 18:
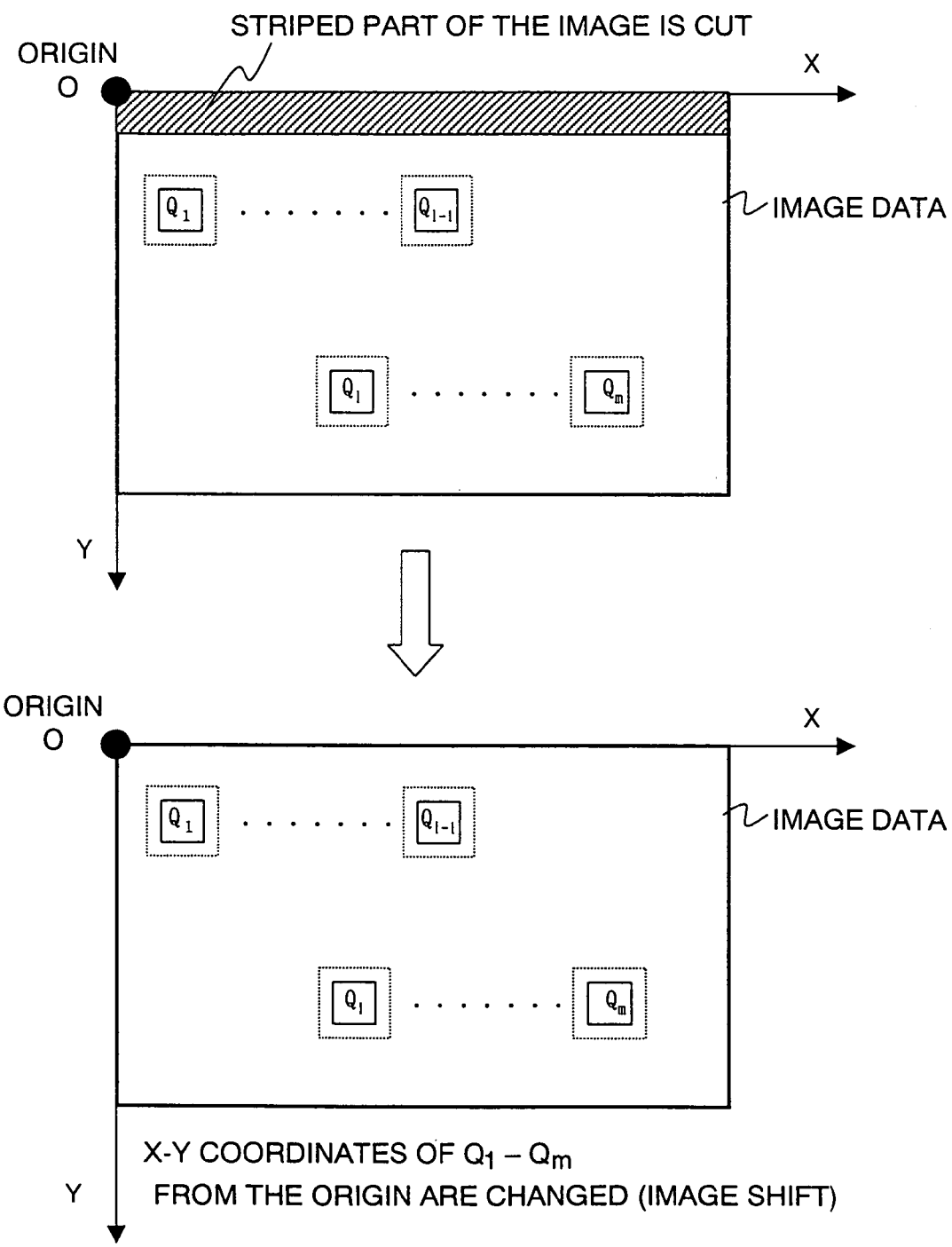
FIG. 18 is a view for explaining problems in information embedding and extracting processing on image data by a digital watermark technique, in the case that image shift has been carried out on the image data.

In FIG. 17, it is assumed that the origin O of the X-Y coordinates for specifying a position of each pixel constituting image data is set at the upper left vertex of the image data in question. Here, as shown in FIG. 18, when an upper portion of image data in which digital watermark information is embedded is cut, then, respective embedded positions in the X-Y coordinates of the bits $b_1$–$b_n$ constituting the digital watermark information are changed.

According to the present invention, even in such a case, it is possible to extract each bit constituting digital watermark information.

Now, a first embodiment of the present invention will be described in the following.

First, there is described a digital watermark information embedding apparatus used in a digital watermark system to which the present embodiment is applied.

Figure 1:
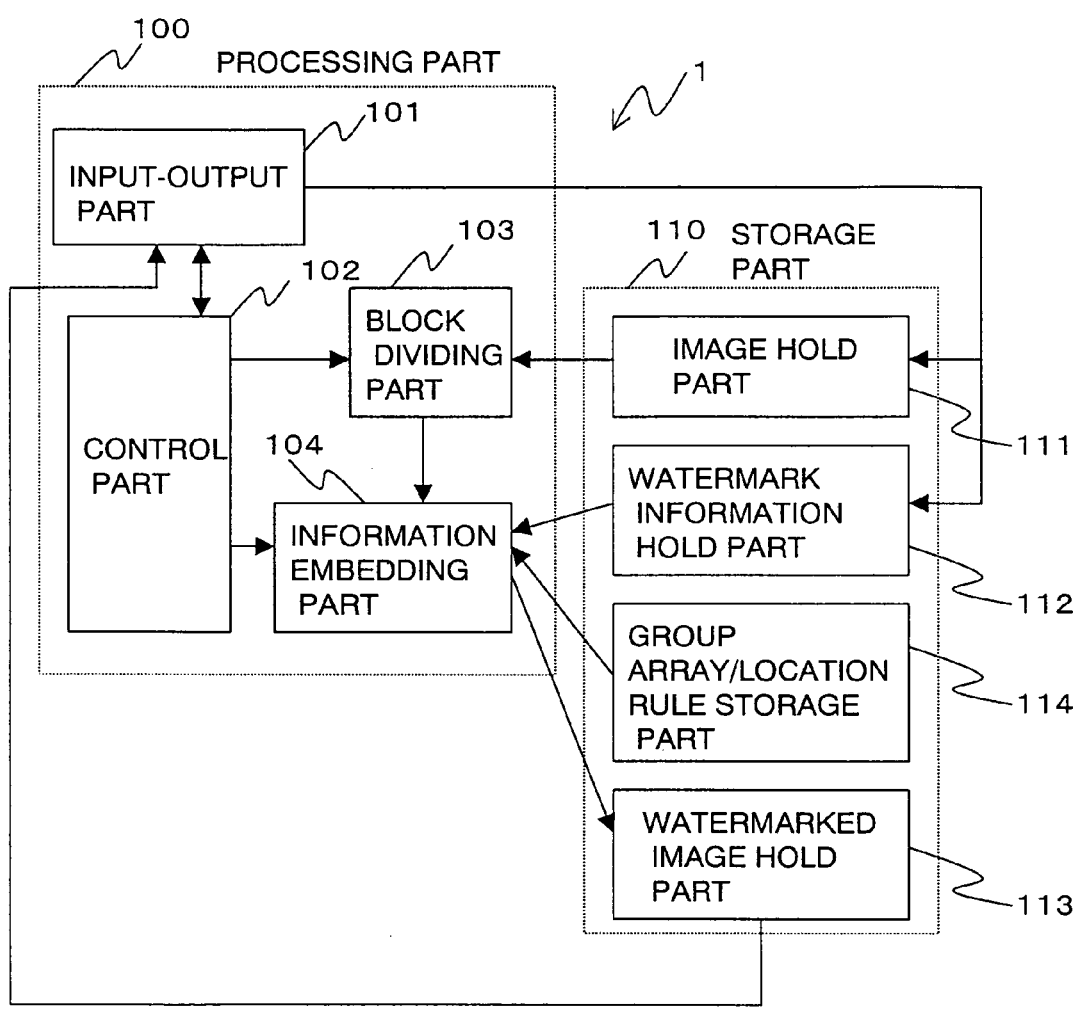
FIG. 1 is a block diagram showing an digital watermark information embedding apparatus 1 used in a digital watermark system to which an embodiment of the present invention is applied.

FIG. 1 is a block diagram showing the digital watermark information embedding apparatus used in the digital watermark system to which the first embodiment of the present invention is applied.

As shown in the figure, the digital watermark information embedding apparatus 1 of the present embodiment comprises a processing part 100 and a storage part 110.

The processing part 100 comprises: an input-output part 101 for inputting and outputting image data, digital watermark information to be embedded in image data, and image data in which digital watermark information is embedded; a control part 102 that controls each part of the digital watermark information embedding apparatus 1 in a unified manner; a block dividing part 103; and an information embedding part 104.

The storage part 110 comprises: an image hold part 111 that holds image data inputted through the input-output part 101; a watermark information hold part 112 that holds digital watermark information $b_1$–$b_n$ ($2 \leq n$) to be embedded in the image data inputted through the input-output part 101 and held in the image hold part 111; a watermarked image hold part 113 that holds image data in which the digital watermark information $b_1$–$b_n$ is embedded; and a group array/location rule storage part 114 that stores a rule of embedding the digital watermark information $b_1$–$b_n$ in the image data.

Figure 2:
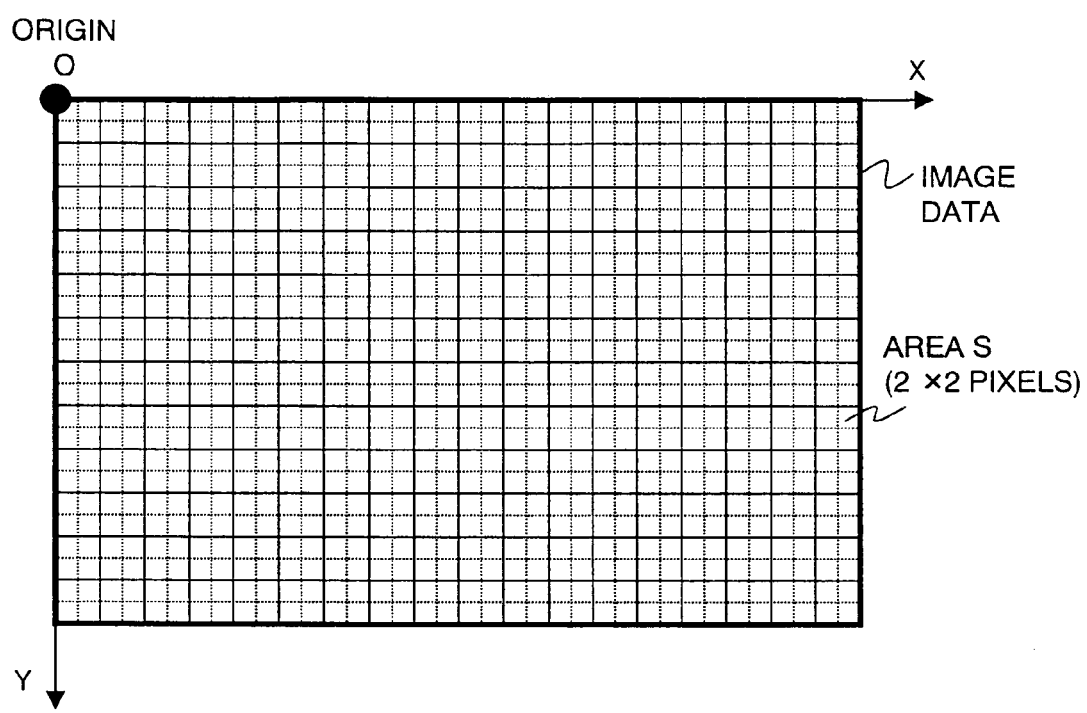
FIG. 2 is a view for explaining an operation principle of a block dividing part 103 of the digital watermark information embedding apparatus 1 shown in FIG. 1.

The block dividing part 103 divides image data held in the image hold part 111 into a plurality of areas S each consisting of M×N ($1 \leq M, N$) pixels, according to the group array/location rule stored in the group array/location rule storage part 114, as shown in FIG. 2.

The information embedding part 104 embeds the digital watermark information $b_1$–$b_n$, which is held in the watermark information hold part 112, in the image data held in the image hold part 111, according to the group array/location rule stored in the group array/location rule storage part 114.

In detail, the digital watermark information $b_1$–$b_n$ and information p that specifies embedding format are embedded in the image data as follows. Namely, groups G, each of which has a predetermined array, are located on the image data so as to cover all the image data. The mentioned array consists of: areas $T_1$–$T_n$ in which the digital watermark information $b_1$–$b_n$ is respectively embedded; an area J in which the information p that specifies embedding format of the digital watermark information $b_1$–$b_n$ in the areas $T_1$–$T_n$ is embedded; and an area H in which information is not embedded. And, a plurality of areas S obtained by division of the image data by the block dividing part 103 are each allocated to some one of the areas $T_1$–$T_n$, J, and H, without fail.

Here, embedding of the digital watermark information $b_1$–$b_n$ and the information p in the image data is carried out by increasing or decreasing brightness of the image data in the corresponding area by U, according to a value (0, 1) of a bit of the information, similarly to the conventional technique. However, in the present embodiment, as a pixel data brightness increasing/decreasing direction pattern depending on a bit value of information to be embedded, two kinds of patterns are prepared in order that extraction of information embedded in a certain area S of each group G is not affected by information embedded in the areas S located on the four sides of the area S in question. The information p is used for specifying this brightness increasing/decreasing direction pattern.

Figure 3:
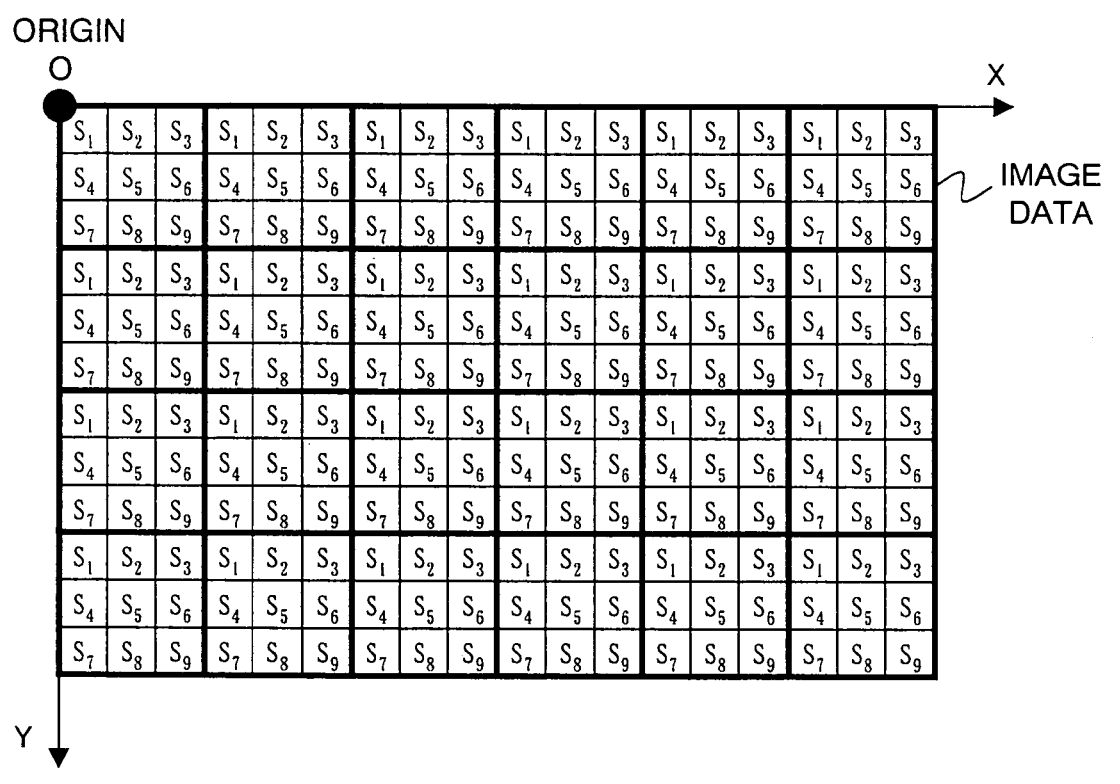
Figure 5:
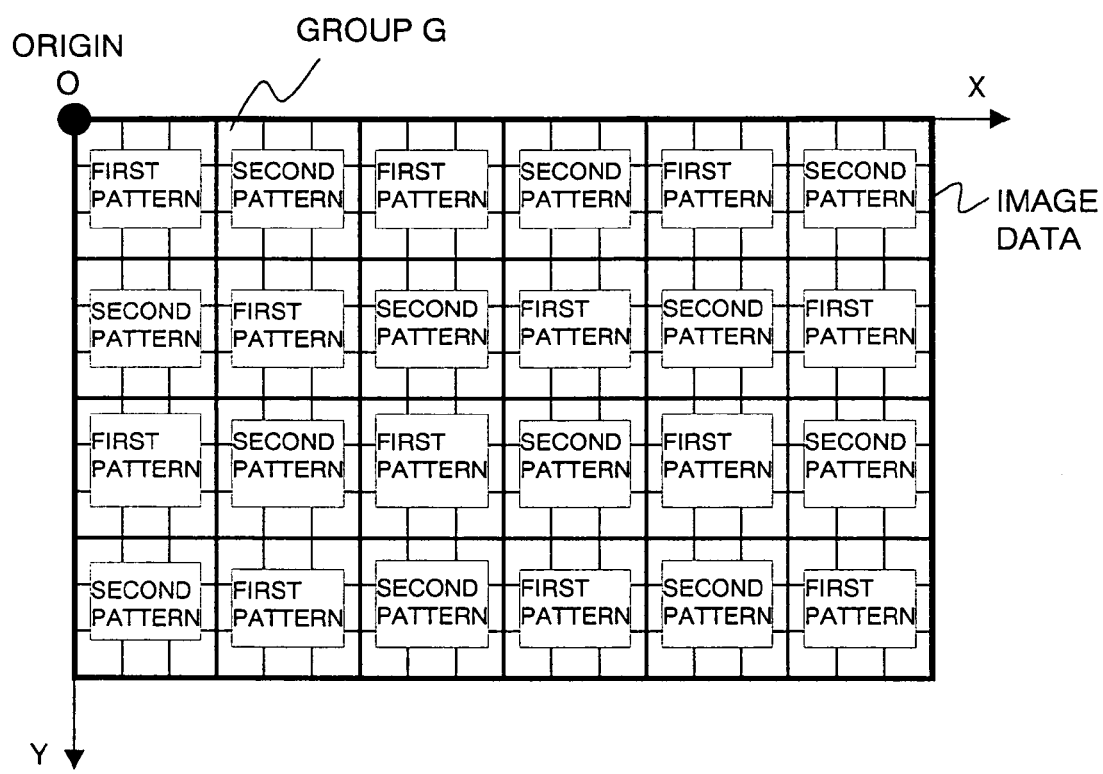
FIG. 5 is a view for explaining the operation principle of the information embedding part 104 of the digital watermark information embedding apparatus 1 shown in FIG. 1.

Here, the pixel data brightness increasing/decreasing direction pattern applied to each group G is set as follows. Namely, for example, in the case that the groups G each consisting of 3×3 (nine in total) areas $S_1$–$S_9$ are located to cover all the image data as shown in FIG. 3, there are prepared a first pattern in which pixel data brightness increasing/decreasing directions for a bit value are same for all the areas $S_1$–$S_9$ within a group G, and a second pattern in which pixel data brightness increasing/decreasing directions are opposite between vertically- or laterally-adjacent areas S, as shown in FIG. 4. Then, as shown in FIG. 5, the patterns are set on the image data so that mutually different brightness increasing/decreasing direction patterns are applied to vertically- or laterally-adjacent groups G.

Further, allocation of the areas $T_1$–$T_n$, J, and H to the areas S within a group G is carried out so as to satisfy the following conditions.

Namely, extraction of the information p, which specifies the applied brightness increasing/decreasing direction pattern, from the image data should be carried out before the brightness increasing/decreasing direction pattern applied to the group G is ascertained. Accordingly, the area J in which the information p is embedded is allocated to an area S whose image data brightness increasing/decreasing direction for a bit value is same for all the brightness increasing/decreasing direction patterns. In the example shown in FIG. 4, the area J is allocated to some one of the areas $S_1$, $S_3$, $S_5$, $S_7$, and $S_9$.

Further, with respect to the area H in which information is not embedded, in order to detect the fact that information is not embedded in this area, it is necessary that the detection is not affected by brightness increasing/decreasing owing to information embedded in the areas located on the four sides of the area in question. Therefore, the area H in which information is not embedded is allocated to such an area S that, according to the employed brightness increasing/decreasing direction patterns, image data brightness increasing/decreasing directions for a bit value are reversed in the areas located on the four sides of the area in question. In the example shown in FIG. 4, the area H is allocated to some one of the areas $S_1$, $S_3$, $S_5$, $S_7$, and $S_9$.

The areas $T_1$–$T_n$ in which the digital watermark information $b_1$–$b_n$ is embedded are necessarily allocated to the other areas $S_1$–$S_9$ than the areas to which the areas J and H have been allocated. In that case, it is desirable to note the following, in order that an error is not caused in the below-described detection of the area H in which information is not embedded.

Namely, in the case that the areas $T_i$ ($1 \leq i \leq n$) are allocated to areas S in which the image data brightness increasing/decreasing direction for a bit value is reversed depending on the brightness increasing/decreasing direction patterns, when brightness averages F for pixel data within the area $T_i$ are obtained respectively for the groups G and added, brightness increase or decrease owing to a bit value of watermark information $b_i$ embedded in that area $T_i$ may be canceled. Accordingly, their total sum $\Sigma F$ does not reflect the brightness increase or decrease owing to the information embedding.

On the other hand, image data brightness increase/decrease directions for a bit value in the adjacent areas located on the four sides of the area $T_i$ in question are same for all the brightness increasing/decreasing direction patterns. Accordingly, with respect to these adjacent areas, the total sum $\Sigma R$ of image data brightness averages R obtained respectively for the groups G reflects the brightness increase or decrease owing to the bit value of the embedded information. Thus, generally, there arises a difference to some degree between the total sum ΣF and the total sum ΣR.

However, in the case that bit values of information embedded in the adjacent areas located on the four sides of the area $T_i$ in question are 1 for two values and 0 for the remaining two areas, then, when the brightness average R of the pixel data embedded in these adjacent areas is taken, brightness increase or decrease is cancelled. Accordingly, the difference between the total sum ΣF and the total some ΣR becomes small, and there is the possibility that the area $T_i$ in question is erroneously detected as the area H in which information is not embedded. Thus, when the area Ti is allocated to an area S for which image data brightness increasing/decreasing direction for a bit value is reversed according to the employed brightness increasing/decreasing direction patterns, the area H in which information is not embedded is allocated to one of the adjacent areas located on the four sides of the area S in question. As a result, the brightness average R of the pixel data embedded in these adjacent areas reflects the brightness increase or decrease owing to a bit value of the embedded information.

Figure 6:
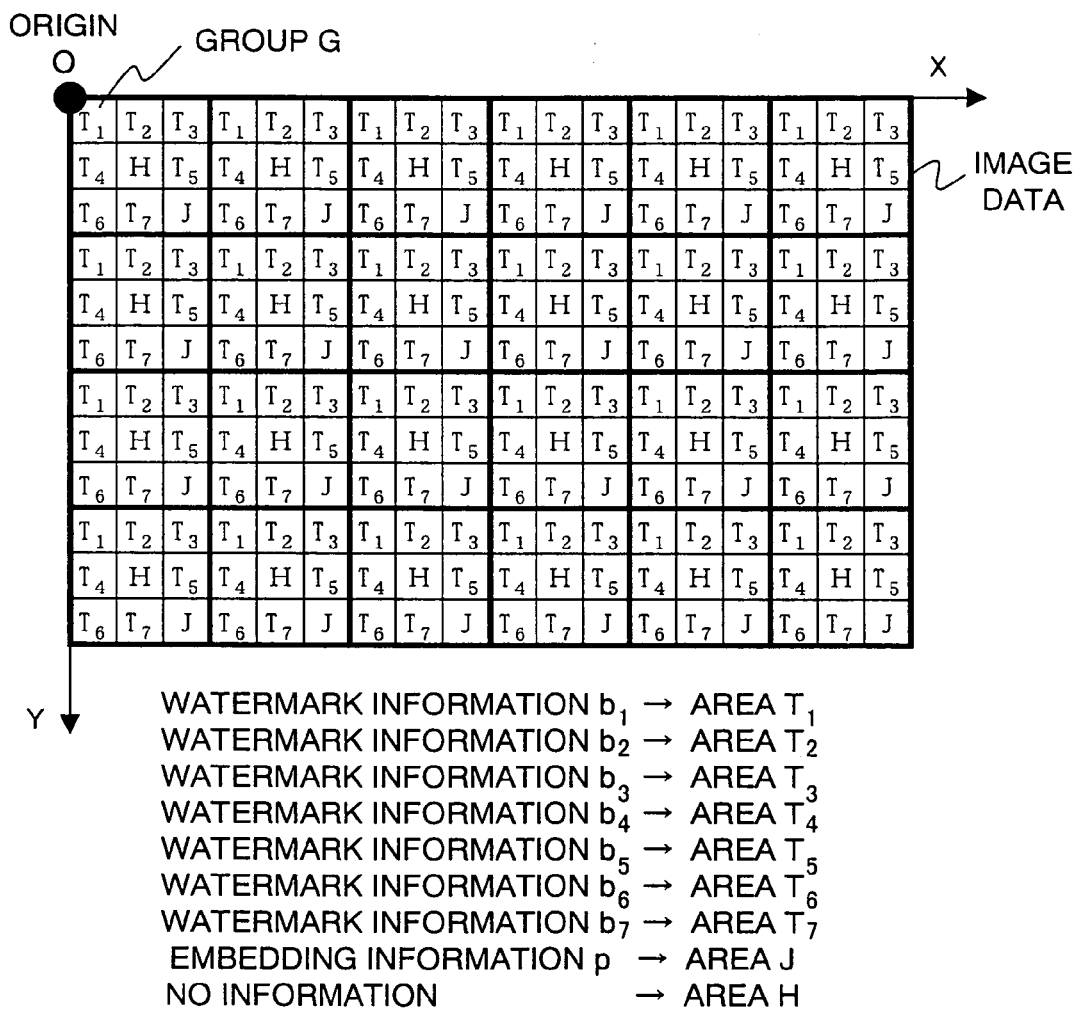
FIG. 6 is a view for explaining the operation principle of the information embedding part 104 of the digital watermark information embedding apparatus 1 shown in FIG. 1.

In the example shown in FIGS. 4 and 5, when the areas $T_1-T_n$, J, and H are allocated to the areas $S_1-S_9$ within a group G, for example, as shown in FIG. 6, the above-described conditions are satisfied.

Next, a hardware configuration of the digital watermark information embedding apparatus to which the present embodiment is applied will be described.

Figure 7:
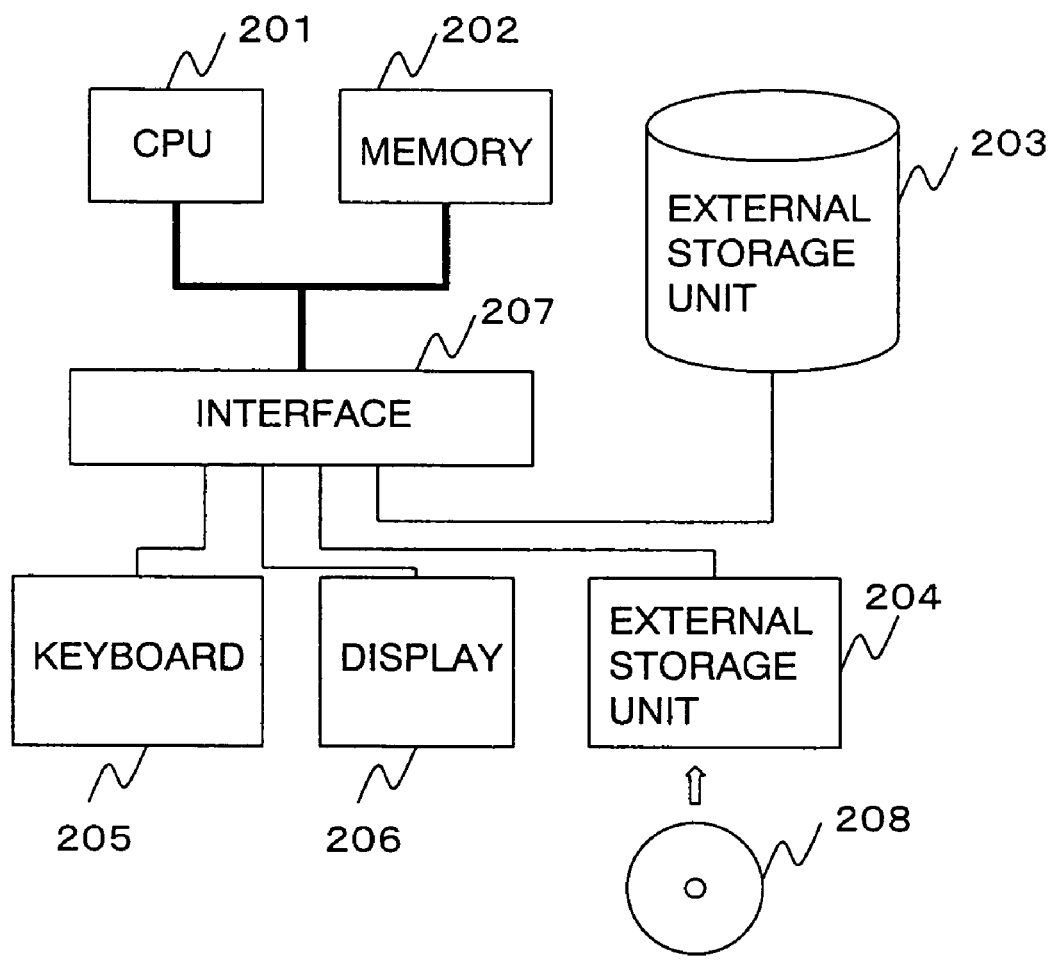
FIG. 7 is a view showing an example of the hardware configuration of the digital watermark information embedding apparatus 1 shown in FIG. 1.

FIG. 7 is a view showing an example of the hardware configuration of the digital watermark information embedding apparatus 1 shown in FIG. 1.

As shown in the figure, the digital watermark information embedding apparatus of the present embodiment can be implemented on an information processing apparatus of general construction comprising a processor (CPU) 201, a memory 202, an external storage unit 203 such as a hard disk unit, another external storage unit 204, an input unit 205 such as a keyboard, an output unit 206 such as a display, and an interface 207 with the external storage units and input and output units. Here, each part of the processing part 100 shown in FIG. 1 is realized as a process that is substantiated on the information processing apparatus when the CPU 201 executes a program loaded onto the memory 202. Further, in this case, the memory 202 and the external storage units 203, 204 are used as the storage part 110 shown in FIG. 1.

The above-mentioned program that is executed by the CPU 201 for substantiating the digital watermark information embedding apparatus of the present embodiment on the information processing apparatus is stored in the external storage unit 203 in advance and loaded onto the memory 202 as the need arises, so as to be executed by the CPU 201. Or, the program may be loaded onto the memory 202 from a portable storage medium 208 such as CD-ROM through the external storage unit 204 that handles the mentioned portable storage medium 208, and then, executed by the CPU 201. Or, the program may be once installed in the external storage unit 203 from a portable storage medium 208 through the external storage unit 204, and thereafter, loaded onto the memory 202 from the external storage unit 203 as the need arises, so as to be executed by the CPU 201. Or, the program may be once downloaded into the external storage unit 203 from a network through a network connecting apparatus (not shown) and loaded onto the memory 202, or directly loaded onto the memory 202 through a network, so as to be executed by the CPU 201.

Next, operation of the digital watermark information embedding apparatus to which the present embodiment is applied will be described.

Figure 8:
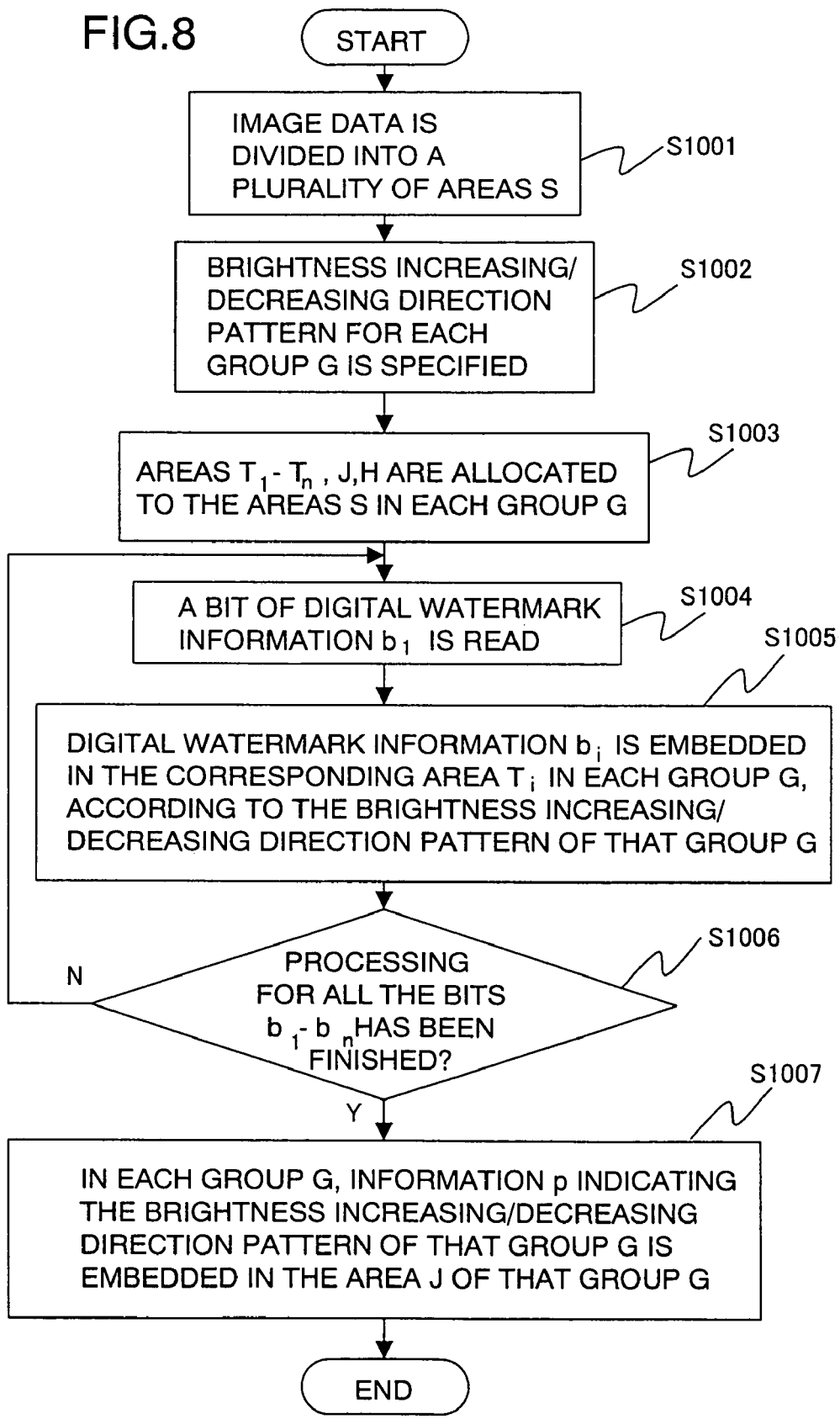
FIG. 8 is a flowchart for explaining operation of the digital watermark information embedding apparatus 1 shown in FIG. 1.

FIG. 8 is a flowchart for explaining operation of the digital watermark information embedding apparatus 1 shown in FIG. 1. This flow is started when the control part 102 cooperates with the input-output part 101 to make image data and digital watermark information $b_1-b_n$ held in the image hold part 111 and the watermark information hold part 112, respectively.

First, as previously described referring to FIG. 2, the block dividing part 103 divides the image data held in the image hold part 111 into a plurality of areas S each consisting of predetermined M×N (1≦M, N) of pixels, according to the rule stored in the group array/location rule storage part 114 (Step S1001).

Next, as previously described referring to FIGS. 2–5, the information embedding part 104 establishes a brightness increasing/decreasing direction pattern (first pattern or second pattern) applied to each group G, according to the rule stored in the group array/location rule storage part 114 (Step S1002). Then, as previously described referring to FIG. 6, groups G are located one after another to cover all the image data, according to the rule stored in the group array/location rule storage part 114. Each of the groups G has a predetermined array consisting of the areas $T_1-T_n$ in which the digital watermark information $b_1-b_n$ is embedded respectively, the area J in which the information p specifying brightness increasing/decreasing direction patterns is embedded; and the area H in which information is not embedded. And, the areas $T_1-T_n$, J, and H are allocated to a plurality of areas S obtained by division of the image data by the block dividing part 103 such that each area S is necessarily allocated with some one of the areas $T_1-T_n$, J, and H (Step S1003).

Next, the information embedding part 104 reads one bit $b_i$ (1≦i≦n) of the digital watermark information from the watermark information hold part 112 (Step S1004). Then, the digital watermark information $b_i$, which has been read, is embedded in the corresponding area $T_i$ of each group G allocated in Step S1003, by increasing or decreasing brightness of the pixel data within the area $T_i$ in question by U depending on the bit value of the digital watermark information $b_i$, according to the brightness increasing/decreasing direction pattern of each group G established in Step S1002 (Step S1005).

Next, when the processes of the above-described Steps S1004 and S1005 are carried out for all the digital watermark information $b_1-b_n$ held in the watermark information hold part 112 (Step S1006), then the information embedding part 104 embeds the information p identifying the brightness increasing/decreasing direction pattern (first or second pattern) established in Step S1003 (Step S1007). Here, as described above, with respect to the embedding of the information p in the area J, the pixel data brightness increasing/decreasing direction for a bit value is same for all the brightness increasing/decreasing direction patterns.

When embedding of the information p in the area J of each group G is finished, namely, when embedding of the digital watermark information $b_1-b_n$ and the information p, which specifies the embedding format of the digital watermark information for each group G, in the image data are finished, then the watermarked image hold part 113 is made to hold the processed image data, to finish the present flow. The image data held in this image hold part 113 is outputted as the watermarked image data through the input-output part 101, as the need arises.

Next, there will be described a digital watermark information extracting apparatus used in a digital watermark system to which the present embodiment is applied.

Figure 9:
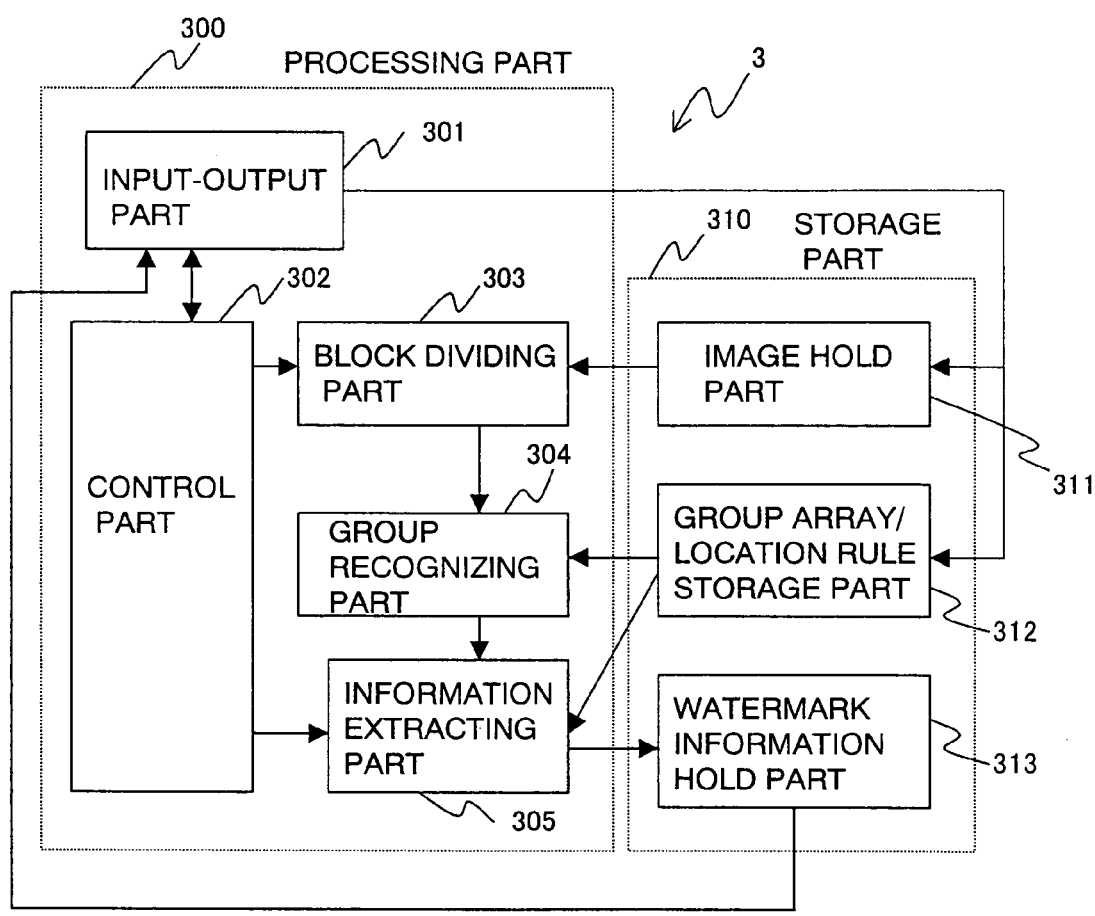
FIG. 9 is a block diagram showing a digital watermark information extracting apparatus 3 used in a digital watermark system to which an embodiment of the present invention is applied.

FIG. 9 is a block diagram showing the digital watermark information extracting apparatus used in the digital watermark system to which an embodiment of the present invention is applied.

As shown in the figure, the digital watermark information extracting apparatus 3 of the present embodiment comprises a processing part 300 and a storage part 310.

The processing part 300 comprises: an input-output part 301 for inputting and outputting image data in which digital watermark information is embedded and the digital watermark information extracted from that image data; a control part 302 for controlling each part of the digital watermark information extracting apparatus 3 in a unified manner; a block dividing part 303; a group recognizing part 304; and an information extracting part 305.

The storage part 310 comprises: an image hold part 311 for holding image data in which digital watermark information $b_1-b_n$ is embedded and which is inputted through the input-output part 301; a group array/location rule storage part 312 for storing a rule of extracting the digital watermark information $b_1-b_n$ from the image data; and a watermark information hold part 313 for holding the digital watermark information $b_1-b_n$ extracted from the image data. Here, the rule stored in the group array/location rule storage part 312 is same as the rule stored in the group array/location rule storage part 114 of the digital watermark information embedding apparatus 1 shown in FIG. 1.

The block dividing part 303 divides image data embedded with the digital watermark information $b_1-b_n$, which is held in the image hold part 311, into a plurality of areas S each consisting of M×N ($1 \leq M, N$) pixels in the same manner as the block dividing part 303 of the digital watermark information embedding apparatus 1 shown in FIG. 1. Here, the size (M×N) of the area S is set as the area S established in the block dividing part 303 of the digital watermark information embedding apparatus 1 shown in FIG. 1.

The group recognizing part 304 recognizes respective locations of a plurality of groups G located on the image data embedded with the digital watermark information $b_1-b_n$, which is held in the image hold part 311, according to the rule stored in the group array/location rule storage part 312. In detail, this is carried out in the following manner.

First, temporary groups G' each having the same size and shape as the group G specified by the rule stored in the group array/location rule storage part 312 are located on the image data divided into a plurality of areas S by the block dividing part 303, in a predetermined manner specified by the rule stored in the group array/location rule storage part 312 (namely, located so as to cover all the image data).

Next, for respective areas S of the temporary groups G' located on the image data as described above, it is examined if information is embedded or not, so as to detect the area H in which information is not embedded.

In detail, for example, the case that the temporary groups G' each having the same size and shape as the group G consisting of 3×3 (nine in total) areas $S_1-S_9$ as shown in FIG. 3 are located to cover all the image data may be considered. In that case, with respect to the area $S_i$ ($1 \leq i \leq 9$), a brightness average F for pixel data within the area $S_i$ in question is obtained for each temporary group G', and the total sum $\Sigma F$ of these averages is obtained. Further, a brightness average R for pixel data in the adjacent areas located on the four sides of the area $S_i$ in question is obtained, and the total sum $\Sigma R$ of these averages is obtained.

Then, if the condition $|\Sigma F - \Sigma R| \leq Th$ (where Th differs depending on required error rates, and, for example, it is assumed that $Th = \frac{1}{2} \times U \times m$ (m: the number of the temporary groups G' located on the image data)) is satisfied, it is judged that some information is embedded in the area $S_i$ in question. On the other hand, if the condition $|\Sigma F - \Sigma R| < Th$ is satisfied, it is judged that information is not embedded in the area $S_i$ in question. This process is carried out for all the areas $S_1-S_9$ so as to detect the area in which information is not embedded.

As described above, with respect to an area S that is allocated to another area than the area H in which information is not embedded, when the image data brightness increasing/decreasing direction for a bit value is same for all the brightness increasing/decreasing direction patterns, then, the total sum $\Sigma F$ of the pixel data brightness averages F obtained for that area respectively in the temporary groups G' reflects brightness increase or decrease owing to information embedded in the area in question. On the other hand, with respect to the total sum $\Sigma R$ of the pixel data brightness averages R obtained for the adjacent areas located on the four sides of the area in question respectively in the temporary groups G', image data brightness increasing/decreasing direction for bit values in these adjacent areas is reversed depending on the brightness increasing/decreasing direction patterns. Accordingly, brightness increase or decrease owing to embedded information is cancelled. As a result, there is generated a difference between the total sum $\Sigma F$ and the total sum $\Sigma R$ to some degree.

Further, with respect to an area S that is allocated to another area than H in which information is not embedded, when the image data brightness increasing/decreasing direction for a bit value is reversed according to the employed brightness increasing/decreasing direction patterns, then, brightness increase or decrease owing to information embedded in the area S in question is cancelled in the total sum $\Sigma F$ of the pixel data brightness averages F obtained for that area respectively in the temporary groups G'. On the other hand, the total sum $\Sigma R$ of the pixel data brightness averages R obtained for the adjacent areas located on the four sides of the area in question respectively in the temporary groups G' reflects brightness increase or decrease owing to information embedded in these areas. The reason is that the image data brightness increasing/decreasing direction for bit values in these adjacent areas is same for all the brightness increasing/decreasing direction patterns, and one of these four adjacent areas is the area H in which information is not embedded. Thus, the total sum $\Sigma R$ reflects brightness increase or decrease owing to the information embedded in these three areas other than the area H. As a result, there arises a difference to some degree between the total sum $\Sigma F$ and the total sum $\Sigma R$.

In contrast, the area H in which information is not embedded is allocated to an area S for which image data brightness increasing/decreasing direction for bit values in the adjacent areas located on the four sides of the area in question is reversed depending on the brightness increasing/decreasing direction patterns. Accordingly, brightness increase or decrease owing to embedded information is cancelled in the total sum $\Sigma R$ of the pixel data brightness averages R obtained for the adjacent areas located on the four sides of the area in question respectively in the temporary groups G'. On the other hand, since information is not embedded in the area H at all, the total sum $\Sigma F$ of the pixel data brightness averages F obtained for the area in question respectively in the temporary groups G' does not include brightness increase or decrease owing to information embedding. As a result, a difference generated between the total sum ΣF and the total sum ΣR is small.

Accordingly, it is possible to detect the area H in which the information is not embedded by obtaining the difference between the total sum ΣF and the total sum ΣR obtained for the temporary groups G' with respect to the area $S_i$.

Next, when the areas H in which information is not embedded are detected as described above, then a plurality of groups G, which are located on the image data and each have a predetermined array specified by the rule stored in the group array/location rule storage part 312, are recognized based on the locations of the areas H on the image data. That array consists of: the areas $T_1$–$T_n$ in which digital watermark information $b_1$–$b_n$ is embedded respectively; the area J in which the information p specifying the image data brightness increasing/decreasing direction pattern is embedded; and the area H in which information is not embedded.

Now, for example as shown in FIG. 6, it is assumed that digital watermark information $b_1$–$b_7$ is embedded in image data such that groups G are located one after another so as to cover all the image data, each group G consisting of the areas $T_1$–$T_7$ in which digital watermark information $b_1$–$b_7$ is embedded respectively, the area J in which information p is embedded, and the area H in which information is not embedded, with those areas being allocated to 3×3 (nine in total) areas S in a predetermined array. Then, a case of an image shift caused by cutting this image data by upper one pixel line is considered.

Figure 10:
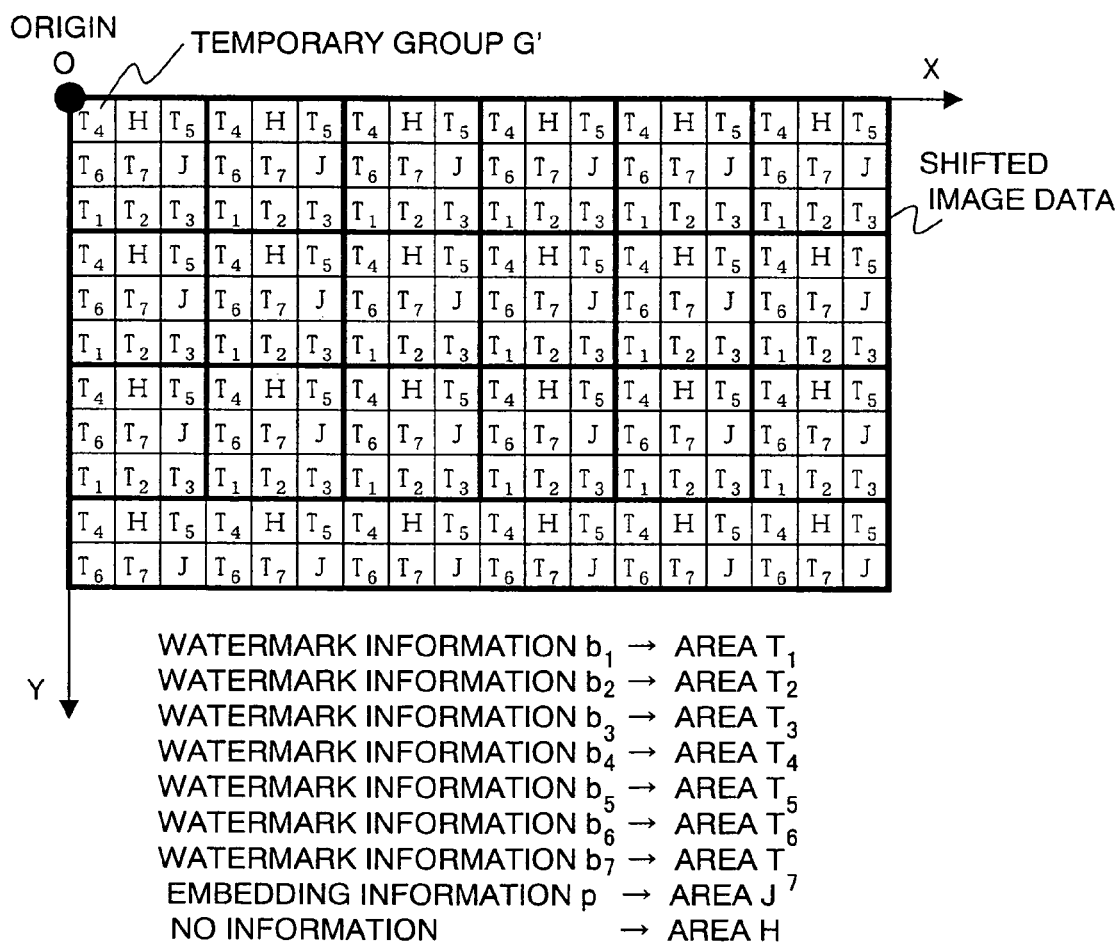
FIG. 10 is a view for explaining an operation principle of a group recognizing part 304 of the digital watermark information extracting apparatus 3 shown in FIG. 9.

In this case, the temporary groups G' are allocated as shown in FIG. 10. In the present embodiment, when digital watermark information is embedded in the image data, the groups G are located one after another on the image data so as to cover all the image data, each group G consisting of the areas $T_1$–$T_7$ in which the digital watermark information $b_1$–$b_7$ is embedded respectively, the area J in which the information p is embedded, and the area H in which digital watermark information is not embedded, these areas being allocated to 3×3 (nine in total) areas S according to the predetermined array. Accordingly, each of the temporary groups G' inevitably includes the area H in which information is not embedded.

Accordingly, by detecting the areas H in which information is not embedded from the image data, it is possible to recognize each of the groups G located on the image data as shown in FIG. 11, based on the positions of the areas H in the image data.

The information extracting part 305 extracts the digital watermark information $b_1$–$b_n$ from the image data embedded with the digital watermark information $b_1$–$b_n$, which is held in the image hold part 311, based on the respective locations of the groups G recognized by the group recognizing part 304.

In detail, first, the information p is extracted from the area J in each group G recognized by the group recognizing part 304, in order to find the brightness increasing/decreasing direction pattern used for embedding information in that group G. Here, in order to extract the information p from the area J, a difference F–R between an average brightness F of the pixel data within the area J and an average brightness R of the pixel data in the adjacent areas located on the four sides of the area J in question is examined. When the difference F–R is more than or equal to a predetermined threshold +Th (set to a slightly lower value than U used in embedding information), it is judged that the information p embedded in that area has a bit value 1. When, the difference F–R is less than or equal to a predetermined threshold –Th, then it is judged that the information p embedded in that area has a bit value 0.

Next, when the value of the information p embedded in the area J of each group G is ascertained, then, with respect to an area $T_i$ ($1 \leq i \leq n$), a difference between an average brightness F for pixel data within that area and an average brightness R for pixel data in the adjacent areas located on the four sides of the area in question is extracted from each group G, taking the brightness increasing/decreasing direction pattern specified by the mentioned information p into consideration. Here, the consideration of the brightness increasing/decreasing direction pattern specified by the information p means the following. Namely, when the brightness increasing/decreasing direction pattern specified by the information p of a certain group G indicates that digital watermark information $b_i$ is embedded such that brightness for an area $T_i$ of the group G in question is increased by U for a bit 1 and decreased by U for a bit 0, then, F–R is extracted as the difference between the average F and the average R. When the brightness increasing/decreasing direction pattern indicates that the digital watermark information $b_i$ is embedded such that the brightness is decreased by U for a bit 1 and increased by U for a bit 0, then, R–F is extracted as the difference between the average F and the average R. As a result, the difference in the sign of the mentioned difference between the averages for a bit value owing to the difference in the pixel data brightness increasing/decreasing direction for a bit value is cancelled.

When, with respect to an area $T_i$, the difference between the average brightness F of the pixel data within the area $T_i$ and the average brightness R of the pixel data in the adjacent areas located on the four sides of the area in question is extracted for each group G as described above, then, the total sum Z of the differences in question is obtained and compared with a predetermined threshold W (which is set to (a threshold Th set slightly lower than U used for embedding the information)×(the number of the groups recognized by the group recognizing part 304)) to examine the bit value of the digital watermark information $b_i$. For example, when the total sum Z is more than or equal to the threshold +W, then the bit value of the digital watermark information $b_i$ is judged to be 1, and when it is less than or equal to a threshold –W, then the bit value of the digital watermark information $b_i$ is judged to be 0.

The above process is carried out for all the areas $T_1$–$T_n$ so as to extract the digital watermark information $b_1$–$b_n$ from the image data.

Next, a hardware configuration of the digital watermark information extracting apparatus to which the present embodiment is applied will be described.

The hardware configuration of the digital watermark information extracting apparatus of the present embodiment is fundamentally same as the hardware configuration of the digital watermark information embedding apparatus shown in FIG. 7. Namely, it is implemented on an information processing apparatus of general construction comprising CPU 201, a memory 202, an external storage unit 203 such as a hard disk unit, another external storage unit 204, an input unit 205 such as a keyboard, an output unit 206 such as a display, and an interface 207 with the external storage units and input and output units. Here, each part of the processing part 300 shown in FIG. 9 is realized as a process that is substantiated on the information processing apparatus when the CPU 201 executes a program loaded onto the memory 202. Further, in this case, the memory 202 and the external storage units 203, 204 are used as the storage part 310 shown in FIG. 9.

The above-mentioned program that is executed by the CPU 201 for substantiating the digital watermark information extracting apparatus of the present embodiment on the information processing apparatus is stored in the external storage unit 203 in advance and loaded onto the memory 202 as the need arises, so as to be executed by the CPU 201. Or, the program may be loaded onto the memory 202 from a portable storage medium 208 such as CD-ROM through the external storage unit 204 that handles the mentioned portable storage medium 208, and then executed by the CPU 201. Or, the program may be once installed in the external storage unit 203 from a portable storage medium 208 through the external unit 204, and thereafter, loaded onto the memory 202 from the external storage unit 203 as the need arises, so as to be executed by the CPU 201. Or, the program may be once downloaded into the external storage unit 203 from a network through a network connecting apparatus (not shown) and loaded onto the memory 202, or directly loaded onto the memory 202 through a network, so as to be executed by the CPU 201.

Here, the digital watermark information embedding apparatus and the digital watermark information extracting apparatus used in the digital watermark system of the present embodiment may be implemented on the same information processing apparatus.

Next, operation of the digital watermark extracting apparatus to which the present embodiment is applied will be described.

FIG. 12 is a flowchart for explaining operation of the digital watermark information extracting apparatus 3 shown in FIG. 9. This flow is started when the control part 302 cooperates with the input-output part 301 to make image data embedded with the digital watermark information $b_1$–$b_n$ held in the image hold part 311.

First, the block dividing part 303 divides the image data held in the image hold part 311 into a plurality of areas S each having a size set by the block dividing part 303 of the digital watermark information embedding apparatus 1 (Step S3001).

Next, as previously described referring to FIG. 10, the group recognizing part 304 locates the temporary groups G', each of which has the same size and shape as the group G specified by the rule stored in the group array/location rule storage part 312, in the image data divided into a plurality of areas S in the Step S3001, on a predetermined manner specified by the rule stored in the group array/location rule storage part 312 (Step S3002).

Next, as described above, the group recognizing part 304 detects the area H in which information is not embedded for each temporary group G' located on the image data (Step S3003).

Then, as previously described referring to FIG. 11, based on the locations of the detected areas H on the image data, the group recognizing part 304 recognizes a plurality of groups G that are located on the image data and each have the predetermined array specified by the rule stored in the group array/location rule storage part 312 (Step S3004). That array consists of: the areas $T_1$–$T_n$ in which digital watermark information $b_1$–$b_n$ is embedded respectively; the area J in which the information p specifying the image data brightness increasing/decreasing direction pattern is embedded; and the area H in which information is not embedded.

When the group recognizing part 304 finishes the recognition of the groups G, then the information extracting part 305 extracts the information p from the area J in each group G recognized by the group recognizing part 304, and examines the bit value, so as to judge the brightness increasing/decreasing direction patterns used in each group G (Step S3005).

Next, the information extracting part 305 notes an area $T_i$ out of the areas $T_1$–$T_n$ in each group G recognized by the group recognizing part 304 (Step S3006).

Next, with respect to a certain group G, the information extracting part 305 obtains an average brightness F of pixel data within the area $T_i$ of that group G (Step S3007), and then, obtains an average brightness R of pixel data in the adjacent areas located on the four sides of the area $T_i$ in question (Step S3008). Then, with respect to the group G in question, a difference between the average F and the average R is obtained according to the pixel data brightness increasing/decreasing direction that is specified by the brightness increasing/decreasing direction pattern judged in Step S3005 and that is used in embedding the digital watermark information $b_i$ in the area $T_i$ (Step S3009). In detail, when the brightness increasing/decreasing direction pattern for the group G in question indicates that the digital watermark information $b_i$ has been embedded in the area $T_i$ such that the brightness is increased by U for a bit 1 and decreased by U for a bit 0, then, F–R is obtained as the difference between the average F and the average R. On the other hand, when the brightness increasing/decreasing direction pattern indicates that the digital watermark information $b_i$ has been embedded in the area $T_i$ such that the brightness is decreased by U for a bit 1 and increased by U for a bit 0, then, R–F is obtained as the difference between the average F and the average R.

Next, when the processes of Steps S3007–S3009 have been finished for all the groups G recognized by the group recognizing part 304 with respect to the area $T_i$ noted in Step S3006 (Step S3010), then, the information extracting part 305 obtains the total sum Z of the differences obtained for all the groups G in Step S3009 with respect to the area $T_i$, and compares this total sum Z of these differences with the predetermined threshold W (which is set to (a threshold Th set slightly lower than U used for embedding the information)×(the number of the groups recognized by the group recognizing part 304)) (Step S3011). When the total sum Z is more than or equal to the threshold +W, then it is judged that the digital watermark information $b_i$ embedded in the area $T_i$ of each group G is 1 (Step S3012). When the total sum Z is less than or equal to a threshold –W, then it is judged that the bit value of the digital watermark information $b_i$ is 0 (Step S3013). Here, when the total sum Z is less than the threshold +W and more than the threshold –W, then it means that the digital watermark information $b_i$ that should have been embedded in the area $T_i$ is not embedded. In that case, it is possible that processing (for example, rotation processing or scaling processing) other than image shift has been carried out on the image data in which digital watermark information $b_1$–$b_n$ has been embedded by the digital watermark information embedding apparatus 1 of the present embodiment. Accordingly, after carrying out error processing (Step S3014), the present flow is ended.

When the processes of Steps S3006–S3011 are finished for all the areas $T_1$–$T_n$ in which the digital watermark information is embedded (Step S3015), the information extracting part 304 makes the information hold part 313 hold the bit values of the digital watermark information $b_1$–$b_n$, and the present flow is ended. The information $b_1$–$b_n$ held in this watermark information hold part 313 is outputted as the digital watermark information through the input-output part 301 as the need arises.

Hereinabove, the first embodiment of the present invention has been described.

According to the present embodiment, groups G each having a predetermined array consisting of areas $T_1-T_n$ in which digital watermark information $b_1-b_n$ is respectively embedded, an area J in which information p specifying an embedding format is embedded, and an area H in which information is not embedded, are located one after another to cover all the image data, and a plurality of areas S obtained by division of the image data are each allocated to some one of the areas $T_1-T_n$, J, and H, so that the digital watermark information $b_1-b_n$ and the information p are embedded in the image data.

Accordingly, even when image shifting processing is carried out on image data in which digital watermark information $b_1-b_n$ is embedded as described above, and, as a result, X-Y coordinate locations of the area $T_1-T_n$ in which the digital watermark information $b_1-b_n$ is embedded are changed, it is possible to recognize each of the groups G located on the image data in question, as follows. Namely, by dividing the image data, on which the image shifting processing has been carried out, into a plurality of areas S, and by detecting the areas H, in which information is not embedded, out of these areas S, it is possible to recognize each of the groups G located on the image data in question, based on the X-Y coordinates of the detected areas H in the image data.

Particularly, in the present embodiment, temporary groups G' (each having the same shape and size as the group G used in embedding the digital watermark information) are located on the image data (in which the digital watermark information $b_1-b_n$ has been embedded) according to the location rule employed for those groups G in embedding the digital watermark information. Next, by examining the areas S for each of the groups G' located one after another on the image data as described, the area H in which information is not embedded is detected. Then, each of the groups G located on the image data in question is recognized based on the X-Y coordinate value of the detected area H in the image data, and thereby, the areas $T_1-T_n$ in which the digital watermark information $b_1-b_n$ has been embedded are detected on the image data.

Namely, according to the present embodiment, in specifying the detected positions of the areas $T_1-T_n$ on the image data in which the digital watermark information $b_1-b_n$ is embedded, it is sufficient to calculate a difference $|\Sigma F-\Sigma R|$, a number of times corresponding to the number of the areas S contained in each temporary group G' so as to examine if information is embedded or not. As a result, determination of the detected locations of the areas $T_1-T_n$ on the image data in which the digital watermark information $b_1-b_n$ is embedded can be carried out at high speed. This effect is particularly remarkable in the case that, when processing (for example, rotation processing and scaling processing) other than image shift is carried out on the image data in which digital watermark information $b_1-b_n$ has been embedded, the digital watermark extracting apparatus is so constructed that it can specify the detected locations of the areas $T_1-T_n$ on the image data taking such processing into consideration.

The present inventors already invented and filed an application for a patent (Japanese Patent Application No. 10-343119, U.S. Ser. No. 09/388,447 filed on Sep. 2, 1999) on a method of extracting digital watermark information $b_1-b_n$ from the image data that has been subjected to reversible geometric transformation (transformation for which the original image data before the transformation can be recovered) after the digital watermark information $b_1-b_n$ was embedded. This method is carried out by repeating a process of investigating embedded locations in the X-Y coordinates (determined in advance with a person who embeds the information in the image data) in the image data for each of the digital watermark information $b_1-b_n$ while carrying out the same transformation processing on the image data as the left-right reversal, scaling processing, and rotation processing that might have been carried out on the image data in question, until the corresponding digital watermark information $b_1-b_n$ is detected from all the embedded locations.

This method can be applied to the image shift processing. Namely, by repeating a process of changing the origin of the image data in the X-Y coordinates while carrying out the process in combination with the above-mentioned transformation processing, it is also possible to extract the digital watermark information $b_1-b_n$ from the image data on which the reversible geometric transformation and image shift processing have been carried out after embedding of the digital watermark information $b_1-b_n$. However, in that case, the number of times of search for specifying the detected location of each of the digital watermark information $b_1-b_n$ increases extremely and a burden on the processing increases rapidly.

FIGS. 13A and 13B show flowcharts for explaining the difference in processing burdens between the cases of FIGS. 13A and 13B. In the case of FIG. 13A, the method of repeating the same transformation processing as the left-right reversal, scaling processing, and rotation processing that might have been carried out on the image data until the digital watermark information $b_1-b_n$ is extracted is applied to the transformation by image shift processing. In the case of FIG. 13B, the mentioned method is combined with the extract method of the present embodiment.

In FIG. 13A, when rotating processing (S5002) on the image data is carried out up to 360 degrees, increasing by 1 degree, and scaling processing (S5003) is carried out in the range of the magnification ratio of 0.5–2.0 at intervals of 0.1, then the number of search for extracting the digital watermark information $b_1-b_n$ required for combination of left-right reversal (S5001), rotating processing (S5002), and scaling processing (S5003) becomes 2 (for left-right reversal)×360 (for rotation processing)×21 (for scaling processing)=15,120, at most. When, image shift processing (S5004) is carried out in addition, the number of search increases rapidly. Namely, the number of pixels constituting the image data is enormous, and the location of the origin O in the X-Y coordinates required for specifying each pixel data is not always located on the image data (for example, as shown in FIG. 18, it is possible that, when a part of the image data is cut, the origin O in the original data before the cut is located in the cut part). As a result the number of search for the location of the origin O in the X-Y coordinates becomes enormous. The above-mentioned number of search 15,120 is multiplied by this number, and thus the number of times for carrying out the routine (S5006–S5009) of the flow becomes enormous.

On the other hand, as shown in FIG. 13B, according to the case to which the present embodiment is applied, the number of time for carrying out the routine of the flow is not fundamentally changed from the case in which the countermeasure for the image shift processing is not taken. Here is employed S5014 (the flow of FIG. 11) instead of the routine (S5004, S5006) of FIG. 13A.

As described above, the present embodiment is particularly effective for the case that, when geometric transformation processing other than image shift is carried out on image data in which digital watermark information $b_1$–$b_n$ is embedded, the digital watermark extracting apparatus is constructed such that detected location of the areas $T_1$–$T_n$ on the image data can be specified taking such processing into consideration.

Figure 15:
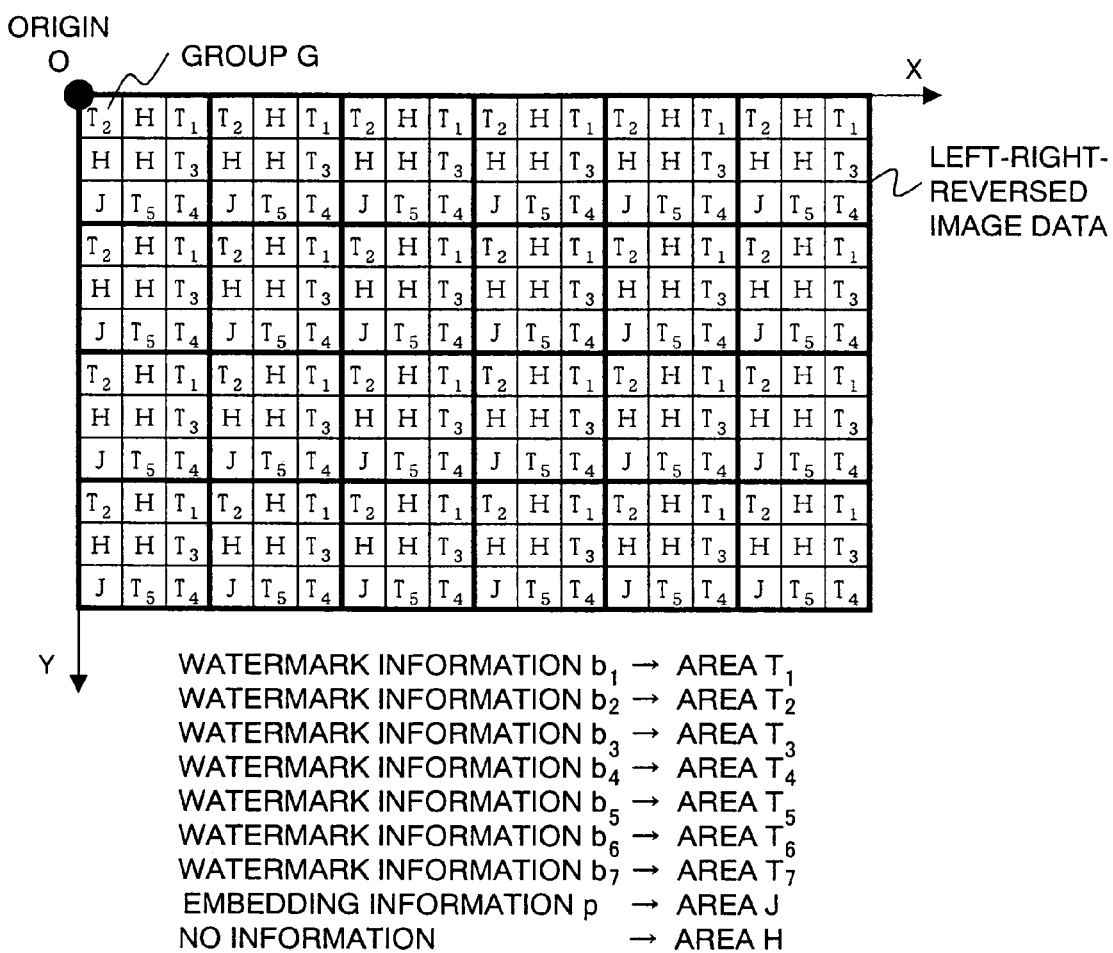
FIG. 15 is a view for explaining a state in which reversal processing has been carried out on the image data having the location pattern of the groups G shown in FIG. 14.
Figure 16:
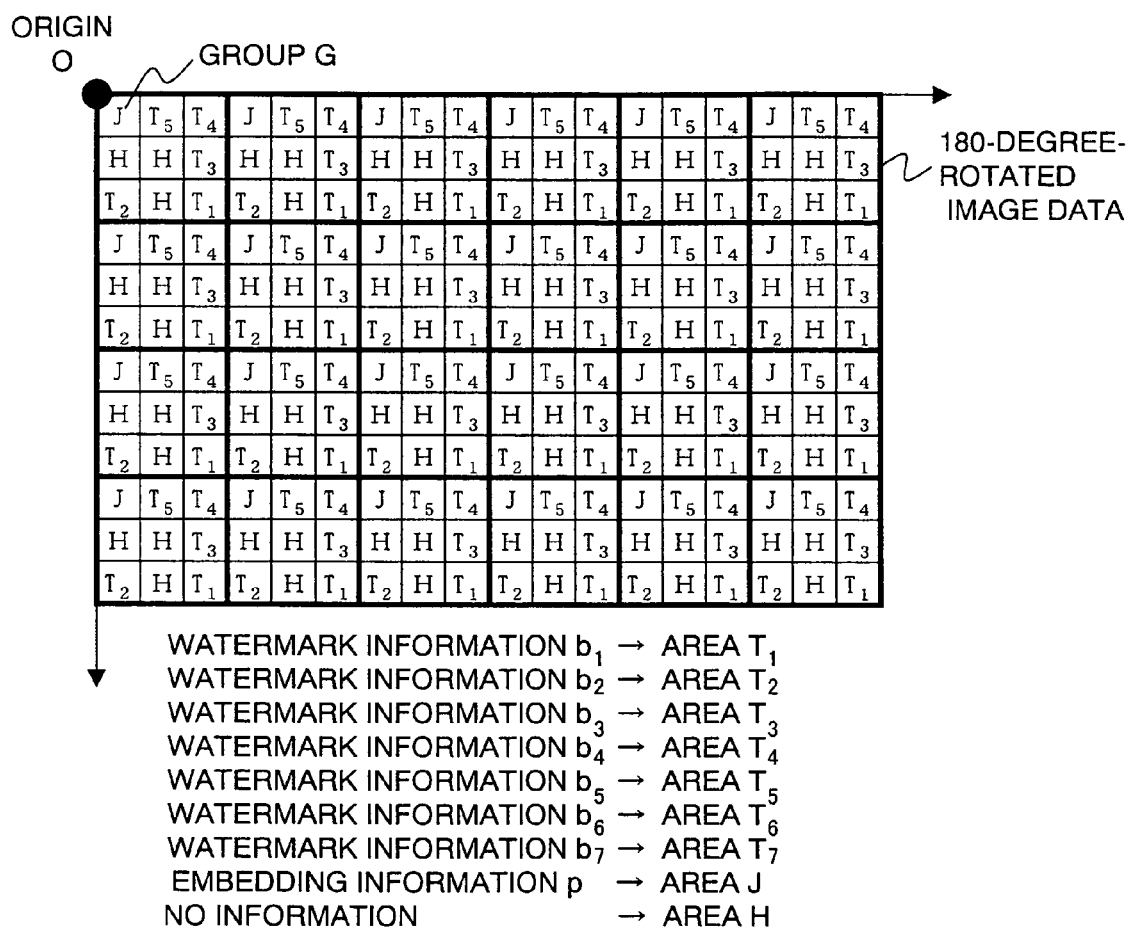
FIG. 16 is a view for explaining a state in which 180-degree rotation processing has been carried out on the image data having the location pattern of the groups G shown in FIG. 14.

Further, the above embodiment has been described with respect to the case that, when digital watermark information is embedded in image data, one area H in which information is not embedded is allocated in each group G. However, a plurality of areas H in which information is not embedded may be allocated in each group G. In that case, as shown in FIG. 14, when those areas H are allocated asymmetrically in the vertical and horizontal directions in each group G, then, by investigating the arrangement of those areas H in extracting the information, it is possible to detect left-right reversal carried out on the image data as shown in FIG. 15 and rotation carried out on the image data as shown in FIG. 16, at the same time.

Figure 14:
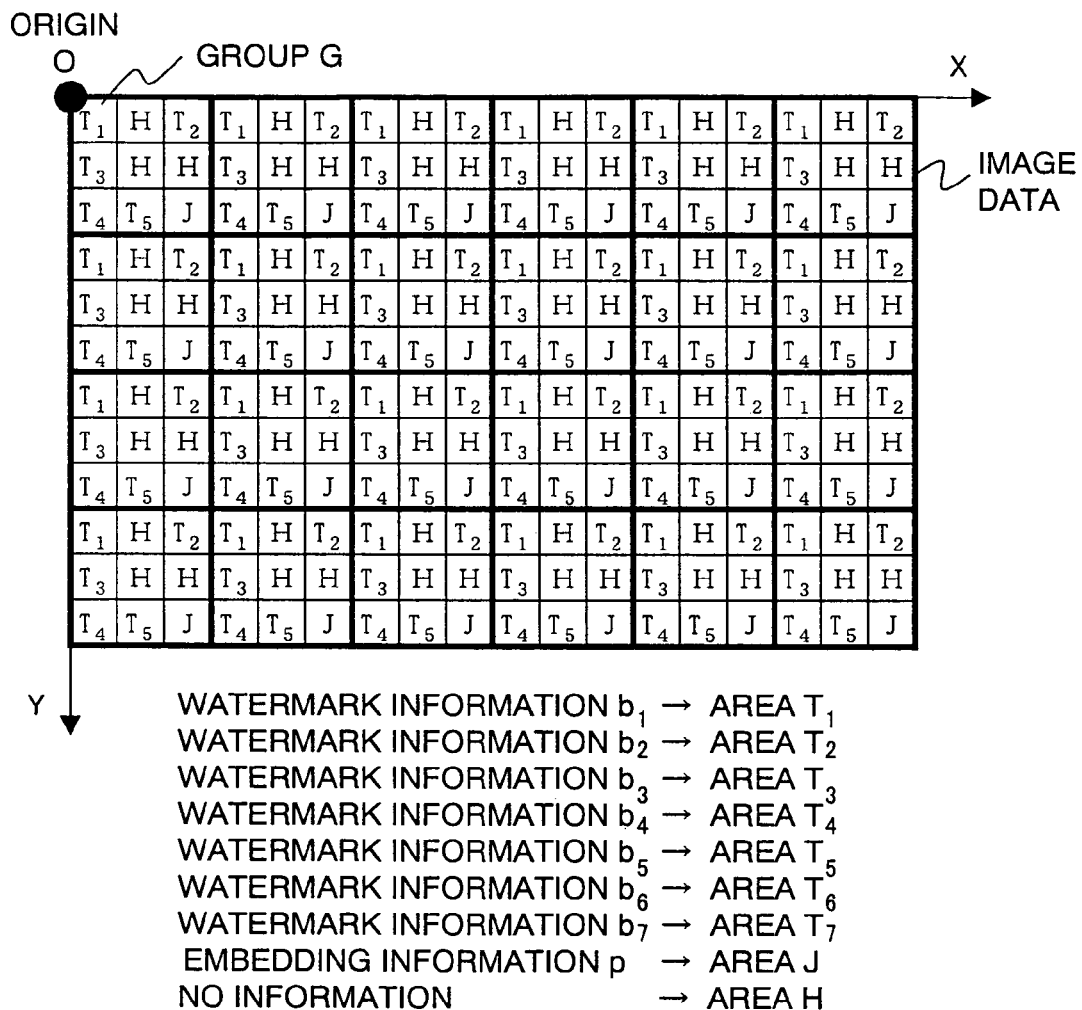
FIG. 14 is a view for explaining a variation of a location pattern for groups G on image data, used in the information embedding part 104 of the digital watermark information embedding apparatus 1 shown in FIG. 1.

Further, instead of a plurality of areas H in which information is not embedded and which are asymmetric in the vertical and horizontal directions as shown in FIG. 14, areas each embedded with a bit value 1 may be allocated, for example. In that case, by detecting the areas having the bit value 1 and arranged in that way, locations of the groups G on the image data can be specified.

Further, in the present embodiment, as the brightness increasing/decreasing direction patterns applied to each group G in embedding digital watermark information in image data, the case in which the two patterns as shown in FIG. 4 are employed has been described. However, three or more patterns may be used. In that case, information $p_1$–$p_k$ (k depends on the number of the patterns) specifying those three or more patters may be allocated in the areas of each group G. Further, any combination of patterns may be employed as long as the difference between the total sum $\Sigma F$ of the pixel data brightness averages F with respect to the area H in which information is not embedded for every groups G and the total sum $\Sigma R$ of the pixel data brightness average R with respect to the adjacent areas located on the four sides of the area in question for every group G is not affected by increase or decrease of brightness owing to the information embedded in these adjacent areas. Further, when the area H in which information is not embedded can be detected in some way without being affected by information embedded in those adjacent areas located on the four sides of the area H in question, then one kind of pattern may be used. In that case, the area J in which the information p is embedded becomes unnecessary. Further, in that case, extraction of digital watermark information from image data is carried out as follows. Namely, for example, with respect to an area $T_i$ ($1 \leq i \leq n$) adjacent to the area H in which information is not embedded, a difference F–R between an average brightness F for pixel data in the area in question and an average brightness R for pixel data in the area H in which information is not embedded is obtained for each group G. Then, the total sum $\Sigma(F-R)$ of the obtained differences F–R is compared with a threshold, in order to judge the bit value of the information embedded in the mentioned area $T_i$. Next, with respect to an area $T_j$ ($1 \leq j \leq$, $j \neq i$) adjacent to the area $T_i$ whose bit value of the embedded information has been judged, a difference F–R' between an average brightness F for pixel data in the area $T_j$ in question and a value R' obtained by subtracting the brightness increase or decrease according to the bit value of the information embedded in the area $T_i$ from the average brightness R for the pixel data in the area $T_i$ is obtained for each group G. Then, the total sum $\Sigma(F-R')$ of the obtained differences F–R' is compared with a threshold in order to judge the bit value of the information embedded in the mentioned area $T_j$. When the digital watermark information $b_1$–$b_n$ is extracted from the image data by carrying out this process for all the areas $T_1$–$T_n$ in which the digital watermark information $b_1$–$b_n$ is embedded, then the bit value of the information embedded in the area $T_i$ can be judged with accuracy without being affected by the information embedded in the areas adjacent to the area $T_i$.

Further, in the present embodiment, information is embedded in an area by increasing or decreasing brightness of the pixel data in that area. However, instead of brightness, another data value may be changed in order to embed information in the area in question.

Further, in the present embodiment, a static image data is taken as an example of an object in which digital watermark information is embedded. Of course, however, the present invention can be applied to a dynamic image. In that case, digital watermark information may be embedded for each frame or field image data as a unit. Further, when a dynamic image has been subjected to inter-frame or inter-field predictive coding, such as MPEG, then the digital watermark information may be embedded in an I-frame.

Further, digital watermark information embedded in image data according to the present embodiment may be used as a watermark for calibration in detecting rotation or scaling carried out on the image data in question.

Namely, after the digital watermark information is embedded in image data as in the present embodiment, digital watermark information on, for example, copyright is embedded in the image data by another method (for example, in the method described above as the conventional technique, by changing color information instead of brightness increasing or decreasing in embedding information).

Then, for extracting the digital watermark information such as copyright from the image data, first a difference in brightness from the adjacent pixel data is investigated for each pixel data constituting the image data, in order to detect the areas in which information is not embedded. Next, reversal processing and rotation processing are carried out so that the size and arrangement pattern of the detected areas become same as the size of the area S and the arrangement pattern of the areas in which information is not embedded, the pattern being specified by the area allocation pattern within each group G and the arrangement pattern of the groups G on the image data, when the digital watermark information was embedded in the image data as in the above-described embodiment. This operation recovers the image data when the digital watermark information was embedded. By previously knowing the relative positions of the locations at which the digital watermark information such as copyright is embedded from the above-mentioned area in which information is not embedded, the information in question on copyright etc. can be extracted from the image data.

As described above, according to the present invention, even when the image shift is carried out on image data in which digital watermark information is embedded, the locations in which digital watermark information is embedded can be specified from the image data in question on which the image shift is carried out.

While the present invention has been described in detail and pictorially in the accompanying drawings, it is not limited to such details, since many changes and modifications recognizable to those of ordinary skill in the art may be made to the invention without departing from the spirit and the scope of thereof.

What is claimed is:

1. A method of embedding digital watermark information $b_1$–$b_n$ ($2 \leq n$) in image data, comprising the steps of:

dividing the image data into a plurality of areas S each consisting of M×N ($1 \leq M, N$) pixels;

defining an area G consisting of P×Q ($1 \leq P, Q$) of the areas S;

allocating each of the areas S constituting said area G to some one of: areas $T_1$–$T_n$ whose pixel values are changed, areas $J_1$–$J_k$ ($1 \leq k$) in which information $p_1$–$p_k$ ($1 \leq k$) specifying an embedding format for embedding said digital watermark information $b_1$–$b_n$ in said areas $T_1$–$T_n$, and areas $H_1$–$H_m$ ($1 \leq m$) whose pixel values are not changed;

corresponding each of said $T_1$–$T_n$, whose pixel values are changed, to each of said digital watermark information $b_1$–$b_n$ and changing the pixel value of each area T according to a bit value;

locating areas $T_1$–$T_n$, areas $J_1$–$J_k$ and areas $H_1$–$H_m$ in a predetermined same arrangement in said area G; and locating said area G repeatedly over entire image data, wherein:

said digital watermark information $b_1$–$b_n$ is embedded by increasing or decreasing pixel data values in the corresponding areas $T_1$–$T_n$ according to a bit value (0, 1) of each bit of the digital watermark information $b_1$–$b_n$; and said information $p_1$–$p_k$ specifying said embedding format is embedded such that said information indicates a pattern of respective increasing/decreasing directions in the area $T_1$–$T_n$ for a bit value of the digital watermark information, in each area G to which the area $J_1$–$J_k$ embedded with said information $p_1$–$p_k$ belong.

2. A method of extracting digital watermark information, for extracting the digital watermark information $b_1$–$b_n$ ($2 \leq n$), a bit value of the digital watermark information being 0 or 1, from image data in which said digital watermark information is embedded, comprising steps of:

dividing the image data into a plurality of areas S each consisting of M×N ($1 \leq M, N$) pixels; detecting areas $H_1$–$H_m$ ($1 \leq m$) in which any of bit information 0 and 1 is not embedded, from said plurality of areas S;

recognizing a plurality of areas G each consisting of P×Q ($1 \leq P, Q$) of the areas S, said plurality of areas G being located on said image data, and said recognition being carried out by comparing locations of said detected areas $H_1$–$H_m$ on said image data and locations of predetermined areas $H_1$–$H_m$ in the areas S;

in each of the plurality of areas G recognized, extracting information $p_1$–$p_k$ ($1 \leq k$) from areas $J_1$–$J_k$ in which said information $p_1$–$p_k$ ($1 \leq k$) in which said information $p_1$–$p_k$ ($1 \leq k$) should be embedded, said information $p_1$–$p_k$ specifying an embedding format for embedding said digital watermark information $b_1$–$b_n$ respectively in said areas $T_1$–$T_n$;

recognizing the embedding format of the digital watermark information $b_1$–$b_n$ in the areas $T_1$–$T_n$ in the areas G in question; and extracting the digital watermark information $b_1$–$b_n$ from the areas $T_1$–$T_n$, according to the recognized embedding format, wherein:

for each of the plurality of groups G recognized, the information $p_1$–$p_k$ embedded in the areas $J_1$–$J_k$ is extracted to recognize a pattern of increasing/decreasing directions of pixel data values for a bit value of the digital watermark information, in the area G in question; and each bit value of the digital watermark information $b_1$–$b_n$ embedded in the areas $T_1$–$T_n$ is detected according to the recognized pattern of increasing/decreasing directions.

3. A program product for making a computer execute a method of embedding digital watermark information $b_1$–$b_n$ ($2 \leq n$) in image data, comprising:

codes for dividing the image data into a plurality of areas S each consisting of M×N ($1 \leq M, N$) pixels;

codes for defining an area G consisting of P×Q ($1 \leq P, Q$) of the areas S;

codes for allocating each of the areas S constituting said area G to some one of: areas $T_1$–$T_n$ whose pixel values are changed, areas $J_1$–$J_k$ ($1 \leq k$) in which information $p_1$–$p_k$ ($1 \leq k$) specifying an embedding format for embedding said digital watermark information $b_1$–$b_n$, a bit value of the digital watermark information being 0 or 1, in said areas $T_1$–$T_n$, and areas $H_1$–$H_m$ ($1 \leq m$) whose pixel values are not changed;

codes for corresponding each of said $T_1$–$T_n$ whose pixel values are changed, to each of said digital watermark information $b_1$–$b_n$ and changing the pixel value of each area T according to a bit value;

codes for locating one or more areas $T_1$–$T_n$, and areas $J_1$–$J_k$ in a predetermined same arrangement in said area G;

codes for locating said area G repeatedly over entire image data;

codes for embedding said digital watermark information $b_1$–$b_n$ by increasing or decreasing pixel data values in the corresponding areas $T_1$–$T_n$ according to a bit value (0, 1) of each bit of the digital watermark information $b_1$–$b_n$;

codes for embedding said information $p_1$–$p_k$ specifying said embedding format such that said information indicates a pattern of respective increasing/decreasing directions in the areas $T_1$–$T_n$ for a bit value of the digital watermark information, in each area G to which the areas $J_1$–$J_k$ embedded with said information $p_1$–$p_k$ belong; and a computer readable storage medium for holding the codes.

4. A program product for making a computer execute a method of extracting digital watermark information $b_1$–$b_n$ ($2 \leq n$), a bit value of the digital watermark information being 0 or 1, from image data in which said digital watermark information is embedded, comprising:

codes for dividing the image data into a plurality of areas S each consisting of M×N ($1 \leq M, N$) pixels;

codes for detecting areas $H_1$–$H_m$ ($1 \leq m$) in which any of bit information 0 and 1 is not embedded, from said plurality of areas S codes for recognizing a plurality of areas G each consisting of P×Q ($1 \leq P, Q$) of the areas S, said plurality of areas G being located on said image data, and said recognition being carried out by comparing locations of said detected areas $H_1$–$H_m$ on said image data and locations of predetermined areas $H_1$–$H_m$ in the areas S;

codes for extracting, in each of the plurality of areas G recognized, information $p_1$–$p_k$ ($1 \leq k$) from areas $J_1$–$J_k$ in which said information $p_1$–$p_k$ (1≦k) should be embedded, said information $p_1$–$p_k$ specifying an embedding format for embedding said digital watermark information $b_1$–$b_n$ respectively in said areas $T_1$–$T_n$;

codes for recognizing the embedding format of the digital watermark information $b_1$–$b_n$ in the areas $T_1$–$T_n$ in the area G in question;

codes for extracting the digital watermark information $b_1$–$b_n$ from the areas $T_1$–$T_n$ according to the recognized embedding format;

codes for extracting, for each of the plurality of groups G recognized, the information $p_1$–$p_k$ embedded in the areas $J_1$–$J_k$ to recognize a pattern of increasing/decreasing directions of pixel data values for a bit value of the digital watermark information, in the area G in question, and to detect each bit value of the digital watermark information $b_1$–$b_n$ embedded in the areas $T_1$–$T_n$ according to the recognized pattern of increasing/decreasing directions; and a computer readable storage for holding the codes.

5. An apparatus for embedding digital watermark information $b_1$–$b_n$ (2≦n) in image data, comprising:

a processing part for dividing the image data into a plurality of areas S each consisting of M×N (1≦M, N) pixels;

a processing part for defining an area G consisting of P×Q (1≦P, Q) of the areas S;

a processing part for allocating each of the areas S constituting said area G to some one of: areas $T_1$–$T_n$ whose pixel values are changed, areas $J_1$–$J_k$ (1≦k) in which information $p_1$–$p_k$ (1≦k) specifying an embedding format for embedding said digital watermark information $b_1$–$b_n$ in said areas $T_1$–$T_n$, and areas $H_1$–$H_m$ (1≦m) whose pixel values are not changed;

a processing part for corresponding each of said $T_1$–$T_n$ whose pixel values are changed, to each of said digital watermark information $b_1$–$b_n$ and changing the pixel value of each area T according to a bit value;

a processing part for locating one or more areas $T_1$–$T_n$, one or more areas $J_1$–$J_k$ and one or more areas $H_1$–$H_m$ in a predetermined same arrangement in said area G;

a processing part for locating said area G repeatedly over entire image data;

a processing part for embedding said digital watermark information $b_1$–$b_n$ by increasing or decreasing pixel data values in the corresponding areas $T_1$–$T_n$ according to a bit value (0, 1) of each bit of the digital watermark information $b_1$–$b_n$; and a processing part for embedding said information $p_1$–$p_k$ specifying said embedding format such that said information indicates a pattern of respective increasing/decreasing directions in the area $T_1$–$T_n$ for a bit value of the digital watermark information, in each area G to which the areas $J_1$–$J_k$ embedded with said information $p_1$–$p_k$ belong.

6. An apparatus for extracting digital watermark information $b_1$–$b_n$ (2≦n), a bit value of the digital watermark information being 0 or 1, from image data in which said digital watermark information is embedded, comprising:

a processing part dividing the image data into a plurality of areas S each consisting of M×N (1≦M, N) pixels;

a processing part for detecting areas $H_1$–$H_m$ (1≦m) in which any of bit information 0 and 1 is not embedded, from said plurality of areas S;

a processing part for recognizing a plurality of areas G each consisting of P×Q (1≦P, Q) of the areas S, said plurality of areas G being located repeatedly over entire said image data, and said recognition being carried out by comparing locations of said detected areas $H_1$–$H_m$ on said image data and locations of predetermined areas $H_1$–$H_m$ in the areas S; a processing part for extracting, in each of the plurality of areas G recognized, information $p_1$–$p_k$ (1≦k) from areas $J_1$–$J_k$ in which said information $p_1$–$p_k$ (1≦k) should be embedded, said information $p_1$–$p_k$ specifying an embedding format for embedding said digital watermark information $b_1$–$b_n$ respectively in said areas $T_1$–$T_n$;

a processing part for recognizing the embedding format of the digital watermark information $b_1$–$b_n$ in the areas $T_1$–$T_n$ in the area G in question;

a processing part for extracting the digital watermark information $b_1$–$b_n$ from the areas $T_1$–$T_n$, according to the recognized embedding format; and a processing part for extracting, for each of the plurality of groups G recognized, the information $p_1$–$p_k$ embedded in the areas $J_1$–$J_k$, to recognize a pattern of increasing/decreasing directions of pixel data values for a bit value of the digital watermark information, in the area G in question, and to detect each bit value of the digital watermark information $b_1$–$b_n$ embedded in the areas $T_1$–$T_n$, according to the recognized pattern of increasing/decreasing directions.

\* \* \* \* \*